United States Patent [19]
Oshumi

[11] Patent Number: 5,616,853
[45] Date of Patent: Apr. 1, 1997

[54] MEASURING MACHINE FOR MEASURING OBJECT

[75] Inventor: Yuzaburo Oshumi, Shiga, Japan

[73] Assignee: Kyocera Corporation, Kyoto, Japan

[21] Appl. No.: 412,658

[22] Filed: Mar. 29, 1995

[51] Int. Cl.⁶ .......................... G01B 13/16; G01B 13/22
[52] U.S. Cl. .............................. 73/37.5; 73/105
[58] Field of Search .................... 73/105, 37.5, 37.6, 73/37.7

[56] References Cited

U.S. PATENT DOCUMENTS

| | | | |
|---|---|---|---|
| 2,982,124 | 5/1961 | Knobel | 73/37.7 |
| 3,194,055 | 7/1965 | Knobel | 73/37.5 |
| 3,710,421 | 1/1973 | Tooka | 73/37.7 |

FOREIGN PATENT DOCUMENTS

| | | | |
|---|---|---|---|
| 45637 | 5/1966 | Germany | 73/37.5 |
| 3243735 | 5/1984 | Germany | 73/37.5 |
| 318862 | 11/1971 | U.S.S.R. | 73/37.5 |
| 1402805 | 6/1988 | U.S.S.R. | 73/37.7 |
| 1551997 | 3/1990 | U.S.S.R. | 73/37.5 |
| 1122115 | 7/1968 | United Kingdom | 73/37.5 |

Primary Examiner—Hezron E. Williams
Assistant Examiner—Daniel S. Larkin
Attorney, Agent, or Firm—Loeb & Loeb LLP

[57] ABSTRACT

A machine for measuring objects includes a piston that is hydrostatically supported in a cylinder. A rod projects from the piston and an injection nozzle is attached to the tip of the rod. A detector detects displacement of the piston in the cylinder. Pressurizing chambers are formed on either side of the piston. One of the pressurizing chambers is linked to the injection nozzle, and the other pressurizing chamber has a pressure control valve.

4 Claims, 22 Drawing Sheets

MEASURING MACHINE FOR MEASURING OBJECT

BACKGROUND OF THE INVENTION

1. Field of the Invention

The present invention relates to a measuring machine used for measuring the linearity, planeness or shape of an object.

The first invention relates to a noncontacting type measuring machine.

2. Description of the Prior Art

Conventionally, the noncontacting type measuring machine 30 (hereinafter referred to as a "measuring machine") used for measuring the linearity, the planeness or shapes has a cylindrical structure as shown in FIGS. 19 and 20, in which a cylinder 34 is divided into two pressurizing chambers by a sealing member 33 such as an O-ring provided on the outer wall face of a piston 31, and the lower pressurizing chamber 37 is linked to an inner hole 35a of an injection nozzle 35 mounted at the tip of a rod 32 projecting from the piston 31 via a tube 39, and there is an outer hole 35b formed on the outer periphery of said inner hole 35a. Furthermore, it has a structure that a needle-contacting portion 36a of an electric micrometer 36 is disposed at the back end of the rod 32, fixed to the cylinder 34 such that the needle-contacting portion 36a contacts with the end face of the rod 32.

In such a measuring machine 30, the air is supplied to the outer hole 35b of the injection nozzle 35 and injected from the tip of the injection nozzle 35 to the surface of the object 50 to be measured, and the back pressure from the object 50 to be measured is taken from the inner hole 35a of the injection nozzle 35 into the lower pressurizing chamber 37. If the pressure which is to be the reference pressure is preliminarily supplied to the upper pressurizing chamber 38, the piston 31 will stop at a position where the back pressure taken into the lower pressurizing chamber 37 and the reference pressure of the upper pressurizing chamber 38 are balanced. At this time, the injection nozzle 35 at the tip of the rod 32 is at rest in a state that it keeps a certain distance between the object 50 to be measured and itself. And if a value of an electric micrometer 36 disposed above the rod 32 has been detected as a reference value, when the measuring machine 30 is moved from side to side, the back pressure is increased/decreased along the surface shape of the object 50 to be measured, whereby the linearity and planeness of the object 50 to be measured can be measured without contacting with the object 50 to be measured, by moving the piston 31 vertically until the pressure in both pressurizing chambers 37 and 38 is balanced again, and detecting the displacement of the piston 31 with the electric micrometer 36.

In the structure of said measuring machine 30, however, since the sealing member 33 provided on the outer wall face of the piston 31 is press contacting with the cylinder 34, the actuation of the piston 31 is bad, and when the piston 31 moves, the followability of the piston 31 has been harmed as sliding resistance is always generated. Furthermore, since the temperature in the cylinder 34 increases due to the friction heat generated by the sliding resistance to expand the air which is a working medium, there may be a difference in the measured value and it is hardly said to be a measuring machine with high precision.

Furthermore, since the sealing member 33 is formed by an elastic body such as rubber, the frictional wear is severe, and there is also such a problem that it has to be changed in a short time.

Therefore, in order to solve the above problems, there has been proposed a measuring machine 40, as shown in FIG. 21, which is composed of an actuator hydrostatically supporting the piston 41 in the cylinder 44, an air micro-type nozzle 45 provided at the tip of the rod 42 projecting from said piston 41, a differential pressure gage 46, and a driving device 49 which moves the piston 41 by an electric signal from the differential pressure gage 46 (Japanese Unexamined Patent Publication No. Hei 4-43210).

In this measuring machine 40, the air supplied to the upper-stage chamber 45b of the two-stage throttled air micro-type nozzle 45 (hereinafter referred to as a "nozzle") is supplied to the lower-stage chamber 45a via an orifice 45c to be injected from the tip of the nozzle 45 to the object 50 to be measured, wherein the back pressure is taken into the lower-stage chamber 45a, the differential pressure with the reference pressure is detected by using a differential pressure gage 46 and the differential pressure is converted into an electric signal. And, when said electric signal is applied to a moving coil 49a (hereinafter referred to as a "coil") which constitutes the driving device 49, a magnetic field is formed between a magnet 49b inserted into the inside of the coil 49a and the coil 49a, and the coil 49a moves according to the Fleming's rule, whereby the nozzle 45 integrally formed with said coil 49a is always kept at a certain distance from the object 50 to be measured, the displacement of the nozzle 45 can be detected by monitoring the electric current sent to the coil 49a, and the surface conditions of the object 50 to be measured can be detected by the detected value. The reference numeral 51 represents bellows.

However, in the measuring machine 40 with the above structure, the influence due to the sliding resistance of the piston 41 could be dissolved, but there were the following problems.

First, the back pressure of the object 50 to be measured taken from the nozzle 45 was a very weak pressure, and even if this back pressure might be enputted directly to the differential pressure gage 46, a dead zone might be caused where the differential pressure with the reference pressure could not be detected with the precision of the current differential pressure gage, and minute unevenness on the surface of the object 50 to be measured could not be detected.

Furthermore, the differential pressure detected by the differential pressure gage 46 is converted to an electric signal to be applied to the coil 49a, but since the coil 49a generates heat due to the electric resistance of the coil 49a itself and is deformed through heat expansion, the magnetic flux density between the magnet 49b and the coil 49a is changed so that the linearity between the electric signal applied to the coil 49a and the moving volume of the piston 41 cannot be obtained, whereby there is a difference in the measured value.

Furthermore, though the coil 49a moves in the axial direction according to Fleming's rule, since the magnetic flux density is after all changed with the movement of the coil 49a, not only the linearity between the electric signal applied to the coil 49a and the moving volume of the piston 41 cannot be obtained, but also too much time is required to apply the differential pressure detected by the differential pressure gage 46 to the coil 49a to move the piston 41, whereby there was also a problem in the responding property.

Furthermore, the magnet 49b had to be disposed with high positional precision on the axis of the coil 49a, and therefore the attachment of the driving device 49 was very difficult.

The second invention relates to a noncontacting type measuring machine improved to make the structure simple.

The third invention relates to a contacting type measuring machine, more particularly relates to a noncontacting type measuring machine for measuring the object which is likely to be deformed and harmed.

Conventionally, both contacting type and noncontacting type measuring machines have been used for measuring shapes and thickness or the degree to which objects are parallel. Contacting type measuring machines have been used for measurements in which high resolution is required.

In the structure of the main part of this contacting type measuring machine, as shown in FIGS. 22(*a*) and (*b*), a probe 151 is attached such that it carries out a seesaw movement with a rotation bearing 152 as a center, and the tip of said probe 151 is formed in a spherical shape. The tip of the probe 151 is pushed to the object to be measured, and the deflection width of the probe 151 is to be detected when the object to be measured or the measuring machine 150 is moved.

Incidentally, these measuring machines 150 have a structure such that a pressure spring 153 is disposed opposite to a shock-absorbing damper 154 at the back end of the probe 151, in order to prevent damage and also prevent the tip of the probe 151 from disengaging the object to be measured.

Furthermore, in these measuring machines 150, there are two types according to the detection method. The measuring machine 150 shown in FIG. 22(*a*) is an electromagnetic induction type, wherein the deflection width of the probe 151 is detected as an impedence change of a coil 156 caused when a rod-like iron piece 155 mounted at the back end of the probe 151 goes in/out the coil 156 provided separately.

Furthermore, a measuring machine 150 shown in FIG. 22(*b*) is a photoelectric type, wherein the deflection width of the probe 151 is detected by detecting the number of the rod-like body 159 mounted at the back end of the probe 151 intercepting the photoelectric slit 160 by using a laser diode 157, a phototransistor 158 and the like, and converting the detected value into the change of respective height.

However, a problem exists with the contacting type measuring machine 150. Because the contact pressure with the object to be measured is large, objects which are easily deformed and damaged cannot be measured. For example, objects which cannot be measured include soft thick-film patterns before firing which are formed in, e.g., laminated chip condensers, IC packages and the like.

Namely, if the tip of the probe 151 of said contacting type measuring machine 150 is contacted with an object to be measured, the resultant forces of the weight of the probe 151, the sliding resistance within the bearing 152 and the elastic forces of the pressure spring 153 work as a contact pressure. And there has been a problem that if the object to be measured is a soft thick-film pattern before firing which is formed in said laminated chip condenser, IC package and the like, the contact pressure is so large that when a contacting type measuring machine 150 or an object to be measured is moved, the probe 151 shaves the surface of the thick film without deflecting to make the measurement impossible.

Furthermore, in the measurement of an object to be measured which is a little harder than said thick film, even if the deflection of the probe 151 can be detected, since the sliding resistance within the bearing 152 and the elastic force of the pressure spring 153 are changed by the deflection width of the probe 151, it has been difficult to measure with always constant contact pressure, and as the pressure spring 153 oscillates easily due to the external mechanical vibration, the obtained measurement result has had a low reliability.

Therefore, in order to reduce the contact pressure with the object to be measured, various contrivances such as material changes and design changes have been tried. However, with the current contacting type measuring machine 150 composed of such members as a probe 151, a bearing 152, a pressure spring 153 and a shock-absorbing damper 154, it has been difficult to reduce the contacting pressure due to the weight and resistance of their own, and it has been impossible to measure an object which is likely to be deformed and damaged.

Furthermore, there have been problems such that these pressure springs 153 and shock-absorbing dampers 154 are weak in impact load, and undergo age changing in a short period of time, and particularly, the reproductivity after repetitively measured is degraded due to the backlash of compression/expansion.

The object of the third invention is to provide a contacting type measuring machine which makes the measurement with high precision possible without causing any deformation or damages for an object which is soft and likely to be deformed or damaged as mentioned above.

The fourth invention relates to a measuring machine having a pressure amplifier for amplifying a pressure signal inputted to the noncontacting type measuring machine of a gas injection style.

A noncontacting type measuring machine 230 which injects air (hereinafter referred to as a "measuring machine") as shown in FIG. 23 has been conventionally used. In this measuring machine 230, a pressure which is to be a reference pressure is supplied to the upper pressurizing chamber 237 which is one of the two pressurizing chambers formed in a cylinder 234 on both sides of a piston 231, and the other lower pressurizing chamber 236 is connected with a hole 222 of an injection nozzle 220 (hereinafter referred to a "nozzle") mounted to a rod 232 projecting from the piston 231, via a tube 240. In addition, another hole 223 is provided on the outer periphery of the hole 222 in the nozzle 220, and is linked to a gas supply opening 221. On the other hand, in order to measure the displacement of the piston 231, a needle-contacting portion 235*a* of a micrometer 235 is mounted to the cylinder 234 so that it always contacts with the upper end face of said piston rod 232.

Therefore, when the air is supplied to the gas supply opening 221 of the nozzle 220 to be injected from the hole 223 of the nozzle 220, the back pressure according to the distance between the object to be measured 225 and the nozzle 220 is taken from the hole 222 of the nozzle 220 into the lower pressurizing chamber 236. When the object to be measured 225 is drawn near to the nozzle 220, said back pressure becomes larger, and at a certain position, the reference pressure of the upper pressurizing chamber 237 and the back pressure of the lower pressurizing chamber 236 are balanced, the piston 231 stops in the cylinder 234 to keep the nozzle 220 at a certain distance with the object to be measured 225. At this time, by measuring the value of the micrometer 235, the measurement preparation is completed.

Then, when said measuring machine 230 is moved horizontally against the object to be measured 225, the back pressure is changed corresponding to the surface shape of the object to be measured 225. As a result, the piston 231 moves, and by measuring the displacement of the piston 231 with the micrometer 235, the surface shape of the object to be measured 225 can be measured.

However, in the case where the surface shape of the object to be measured 225 is delicately changed, there is a case that the back pressure cannot be detected because of being a minute pressure. Therefore, a pressure amplifier 211 as shown in FIG. 24 has been used at the tip portion of the nozzle 220 so that the back pressure can be detected even if being a minute pressure (see Japanese Unexamined Patent Publication No. Sho 58-56405).

In this pressure amplifier 211, a diaphragm 212 formed with a polyethylene film, stainless thin plate and the like is provided in a cylinder body 213, and an input chamber 216 and an output chamber 217 are provided on the both sides of said diaphragm 212. And in the input chamber 216, an injection hole 215 in the axial direction, and a supply hole 214 in the horizontal direction project respectively, and the output chamber 217 is connected with the injection nozzle 220 of a noncontacting type measuring machine 230 with a clearance 218 by bolting and the like.

And while operating the measuring machine 230 as described above, pressure is supplied from the supply hole 214 of the pressure amplifier 211 to inject the air from the injection hole 215, then the back pressure from the object to be measured 225 can be taken into the input chamber 216 and this back pressure can be amplified and transmitted to the output chamber 217 via the diaphragm 212. Namely, if the pressure (the back pressure from the object to be measured 225) input to the input chamber 216 is assumed to be Pi, the pressure injected from the hole 223 of the nozzle 220 is assumed to be Pn, the effective area of the diaphragm 212 is assumed to be Ai, and the effective area of the hole 223 of the nozzle 220 is assumed to be An, the diaphragm 212 is stopped in a state that the force Pi.Ai on the side of the input chamber 216 and the force Pn.An on the side of the output chamber 217 applied to the diaphragm 212 are balanced. At this time, the following equation is realized:

$$Pn=(Ai/An) \times Pi$$

Then, the pressure Pi input from the injection hole 215 is increased or decreased by δPi, the increase or decrease δPn of the pressure Pn input to the nozzle 220 will be Ai/An·δPi and can be taken out amplified by Ai/An times from the above equation, and in the end, the pressire signal can be amplified and taken out by the ratio of the effective area Ai of the diaphragm 212 to the effective area An of the hole 223 of the nozzle 220.

However, there has been a problem shown as follows in the conventional pressure amplifier 211.

In the pressure amplifier 211 having a diaphragm 212 formed with a polyethylene film, since the polyethylene film itself has a large flexibility, there has been a problem that the diaphragm 212 is displaced partially with the pressure change input to the input chamber 216, and a hysteresis is caused in the pressure signal transmitted to the output chamber 217.

Therefore, if a pressure amplifier 211 having a diaphragm 212 formed with a metal plate such as a stainless thin plate is used, though the hysteresis becomes few compared to that of the diaphragm 212 composed of a polyethylene film, conversely there has been a problem that the dynamic resistance becomes large, and a difference is caused in the pressure signal transmitted to the hole 222 of the nozzle 220.

Furthermore, in the conventional pressure amplifier 211, the dynamic resistance differs due to the materials and thickness of the diaphragm 212, and the range which can be amplified has been limited. Therefore, plenty of pressure amplifiers 211 according to the pressure range to be inputted have to be prepared.

Furthermore, the diaphragm 212 made of a metal is likely to be broken in a short time due to the fatigue by repetition of sliding and bending, and the decrease of the life due to the changing with time is fast, whereby the diaphragm could not have been used for a long time. And, there have been various problems that have caused rust and corrosion in the diaphragm 212 in an environment containing much moisture and an environment containing specific gases, and much care should be taken in the measurement atmosphere and storing places.

SUMMARY OF THE INVENTION

Therefore, under the above background, the first invention is a noncontacting type measuring machine, a piston being disposed movably in a cylinder, an injection nozzle being attached to the tip of a rod projecting from said piston, said cylinder having a supporting means for hydrostatically supporting the piston by supplying gas to a clearance between the piston and the cylinder and a detecting means for detecting the displacement that the piston moves, said injection nozzle being linked to one pressurizing chamber of the two pressurizing chambers formed on the upper and the lower sides of the piston, the other pressurizing chamber having a pressure control valve.

In the non contacting type measuring machine according to the first invention, since the piston is hydrostatically supported in the cylinder, the sliding resistance is as good as nonexistent, and the piston can move freely and smoothly, and there is no friction heat caused by the sliding resistance, whereby the gas which is the working medium does not expand. Therefore, there is almost no difference in the movement of the piston and the piston is excellent in the followability.

Furthermore, in the pressurizing chamber having a pressure control valve, even if a pressure change is caused because a part of the pressure supplied to hydrostatically support the piston flows in, it is possible to control the pressure by said pressure control valve so that the pressure is always constant, whereby there is no need to consider the sealability as in the past.

Moreover, in the pressurizing chamber having no pressure control valve, since the leak pressure of the pressure supplied to hydrostatically support the piston is supplied to the injection nozzle and injected, while the back pressure from the object to be measured is directly taken in to move the piston, the responding property is excellent. Therefore, the noncontacting type measuring machine according to the first invention can conduct a measurement with high precision, as it can respond to very feable change in the back pressure.

Furthermore, in order to make the structure simple by improving the noncontacting type measuring machine, the second invention is a noncontacting type measuring machine, a piston being disposed movably in a cylinder, an injection nozzle being attached to the tip of a rod projecting from said piston, said cylinder having a supporting means for hydrostatically supporting the piston and a detecting means for detecting the displacement of the piston, double holes being provided inside said piston and said rod, one hole being linked to the outer wall face of the piston, while a drawn portion being provided in the tip portion, and the other hole being linked to one pressurizing chamber among two pressurizing chambers formed on both the upper and the lower sides of the piston, and in the other pressurizing chamber, a pressure control valve being provided to set up the pressure in said pressurizing chamber.

In the present invention, since the gas pressure from the supporting means which hydrostatically supports the piston can be injected directly from the injection nozzle, by providing a breakthrough inside the piston and the rod and circulating the injection nozzle to the outer wall face of the piston, the injection pressure from the injection nozzle can be raised. Therefore, the measuring machine has an excellent sensitivity. Moreover, the structure thereof can be made very simple, thus a noncontacting type measuring machine can be provided at a very low price, making its activation reliable.

In the third invention, under the above background, a measuring machine is so constituted that a detecting member is attached to the injection nozzle of the noncontacting type measuring machine which detects a surface shape of the object to be measured by converting it to a change volume of the back pressure obtained by injecting a gas, wherein said detecting member has an input chamber formed at the tip thereof and an output chamber formed at the back end thereof by inserting the piston into the inner hole of the cylinder with slackness, a gas supply hole being provided on the side wall of the cylinder to hydrostatically support the piston by supplying a gas to a clearance between said side wall and the piston, and a gas injection nozzle being provided at the tip of the cylinder so that they are linked to the inner hole of the cylinder, respectively, and a pressure-receiving plate having a probe is provided at the tip of said gas injection hole with an interval.

According to the measuring machine of the third invention, when the probe is contacted with the surface of the object to be measured and either the measuring machine or an object to be measured is moved according to the shape of an object to be measured, the probe and the pressure-receiving plate moves vertically, and after detecting the moving volume of the probe and the pressure-receiving plate as the change volume of the gas pressure, the change volume of said gas pressure is transmitted to the noncontacting type measuring machine via a piston, to conduct a measurement.

Namely, the measuring machine of the present invention can measure by converting the moving volume of the probe and the pressure-receiving plate to the change volume of the gas pressure.

Furthermore, since a movable portion of the detecting member is composed of a probe, a pressure-receiving plate and a film, the weight of the movable portion can be suppressed to the minimum, and since it is constituted such that the gas pressure supplied from the gas injection hole is injected from the gas injection hole to the pressure-receiving plate, the injection pressure from the gas injection hole can be adjusted by controlling the gas pressure supplied from the gas injection hole. Therefore, while measurement can be conducted with an optimum contact pressure depending on the object to be measured, measurement with a very small contact pressure 1 g or below is made possible.

Furthermore, since the piston of the detecting member is hydrostatically supported by the gas pressure from the gas injection hole, the sliding resistance of the piston is very small. As a result, the change volume of the back pressure from the pressure-receiving plate can be transmitted to the noncontacting type measuring machine without any difference, whereby excellent measurement precision can be realized.

In the fourth invention, under the above background, a measuring machine is so constituted that a piston is inserted into the inner hole of a cylinder which constitutes the outer frame of the pressure amplifier to form an input chamber at the tip thereof and an output chamber at the back end thereof, an injection hole being provided to project at the tip portion of the cylinder to be linked to said input chamber and a supply hole for feeding air to hydrostatically support the piston being provided on the side wall of the cylinder.

The pressure amplifier of the fourth invention has a piston structure instead of the conventional bellowphragm, whereby there is no hysteresis caused.

Furthermore, since said piston is hydrostatically supported, the sliding resistance is as good as nonexistent, and the piston can move freely and smoothly. As a result, the output signal with no difference can be obtained, whereby excellent linearity can be obtained in a wide range between the input pressure and the output pressure. Moreover, since it has excellent responding property, the input pressure can be measured even if it is minute, and a pressure amplifier having an extremely high reliability can be provided.

DETAILED DESCRIPTION OF THE DRAWING FIGURES

An example of the first invention will now be described.

Figure 1:
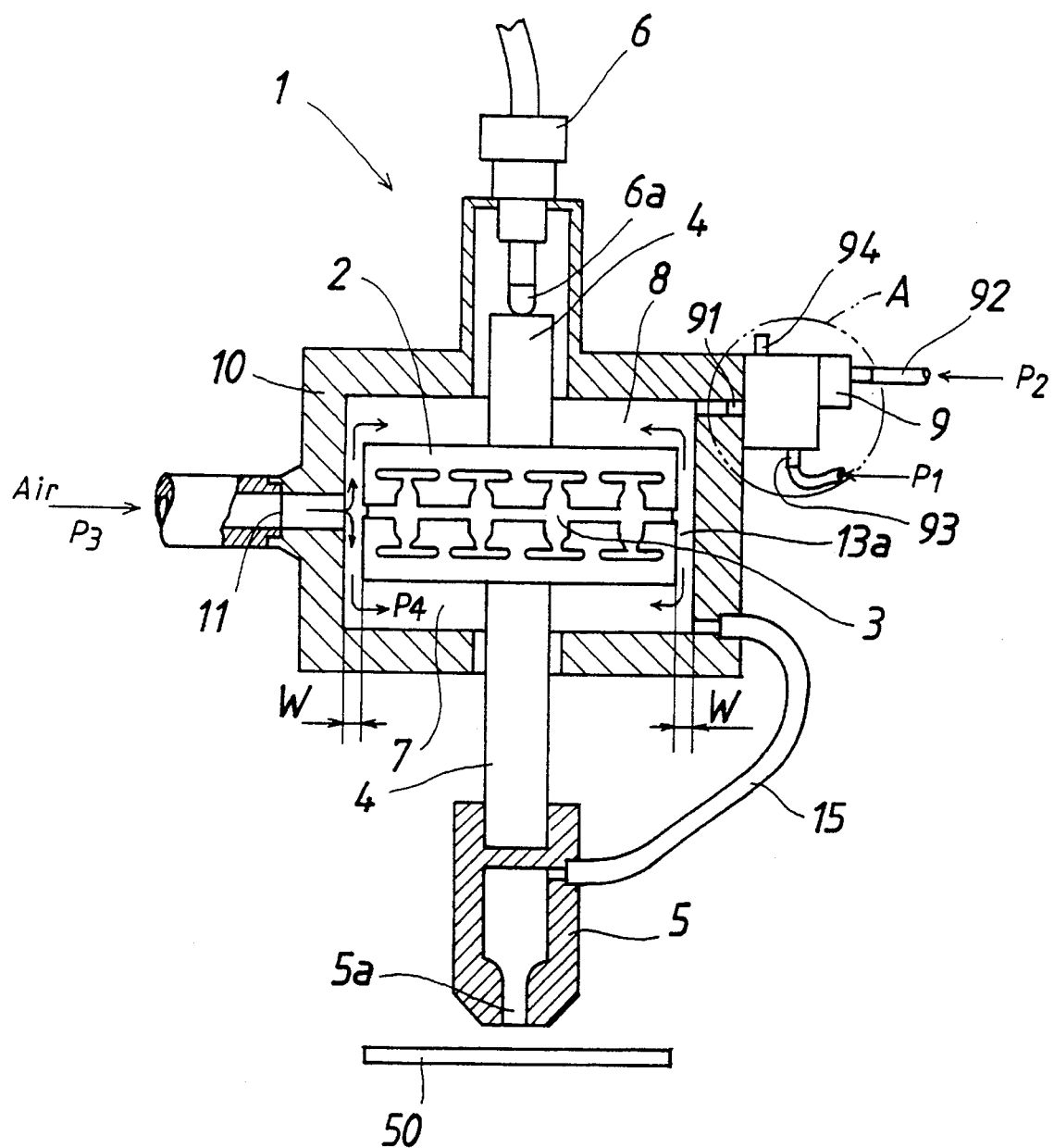
FIG. 1 is a longitudinally sectional view showing a noncontacting type measuring machine of the first invention.
Figure 2:
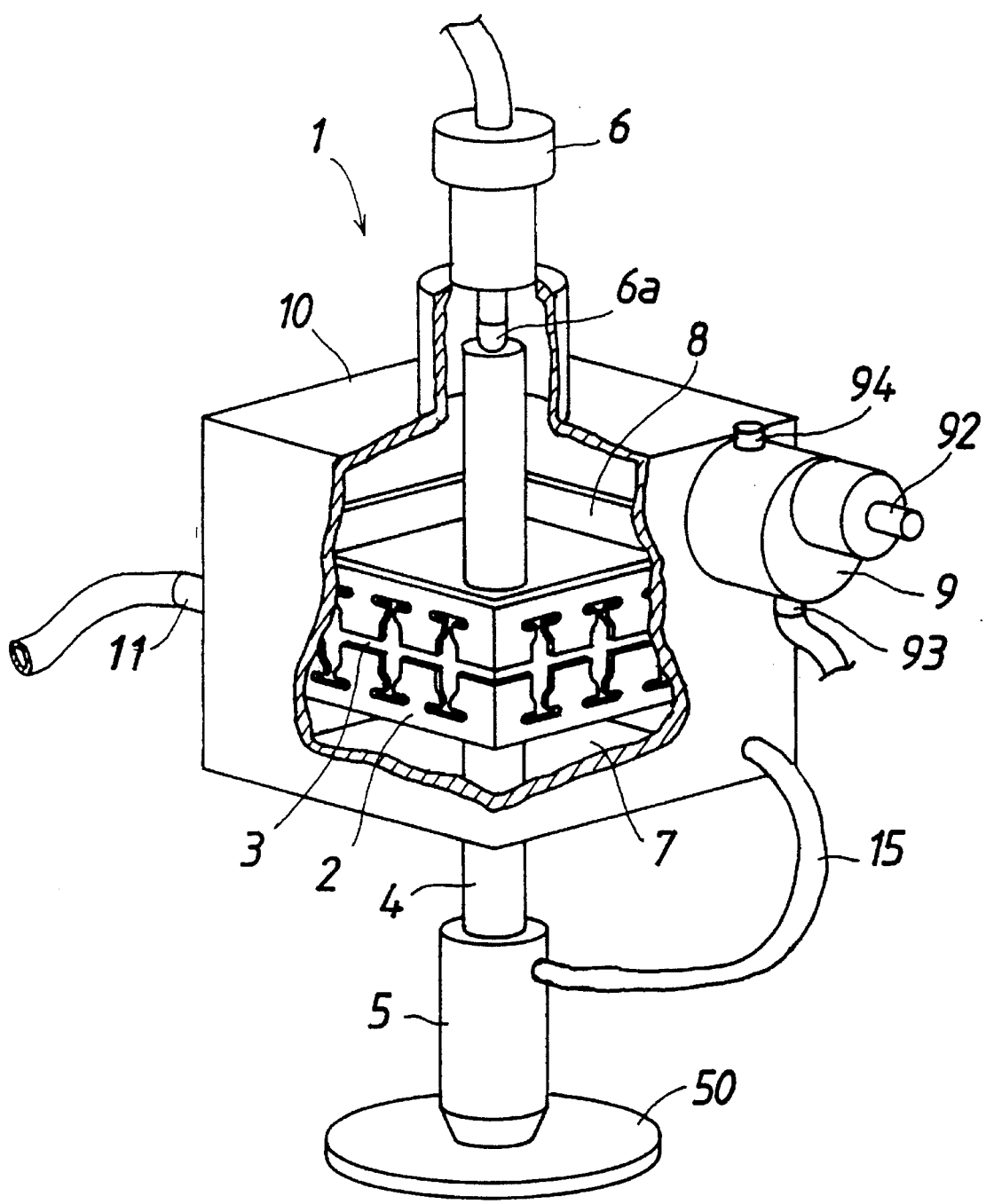
FIG. 2 is a perspective view, a part of FIG. 1 being broken.

FIG. 1 is a longitudinally sectional view showing a noncontacting type measuring machine 1 of the first invention, and FIG. 2 is a perspective view, a part of which is broken, wherein a piston 2 having a draw groove 3 on the outer wall face thereof is inserted into the cylinder 10. An injection nozzle 5 having an inner hole 5a is adhered or attached by screwing or the like at the tip of the rod 4 projecting from said piston 2. Furthermore, as a detecting means for measuring the displacement of the piston 2, an electric micrometer 6 is used, and a needle-contacting portion 6a of said electric micrometer 6 is fixed to the cylinder 10 such that it abuts against the backend face of the rod 4. Furthermore, the inner hole 5a of said injection nozzle 5 is connected with the lower pressurizing chamber 7 of the two pressurizing chambers formed in the cylinder 10 via a tubular body 15 such as a tube and the like, and the other upper pressurizing chamber 8 has a pressure control valve 9 attached thereon.

Furthermore, in a clearance 13a between the piston 2 and the side wall of the cylinder 10, a supply port 11 is provided for hydrostatically supporting the piston 2 by supplying a gas.

Figure 3:
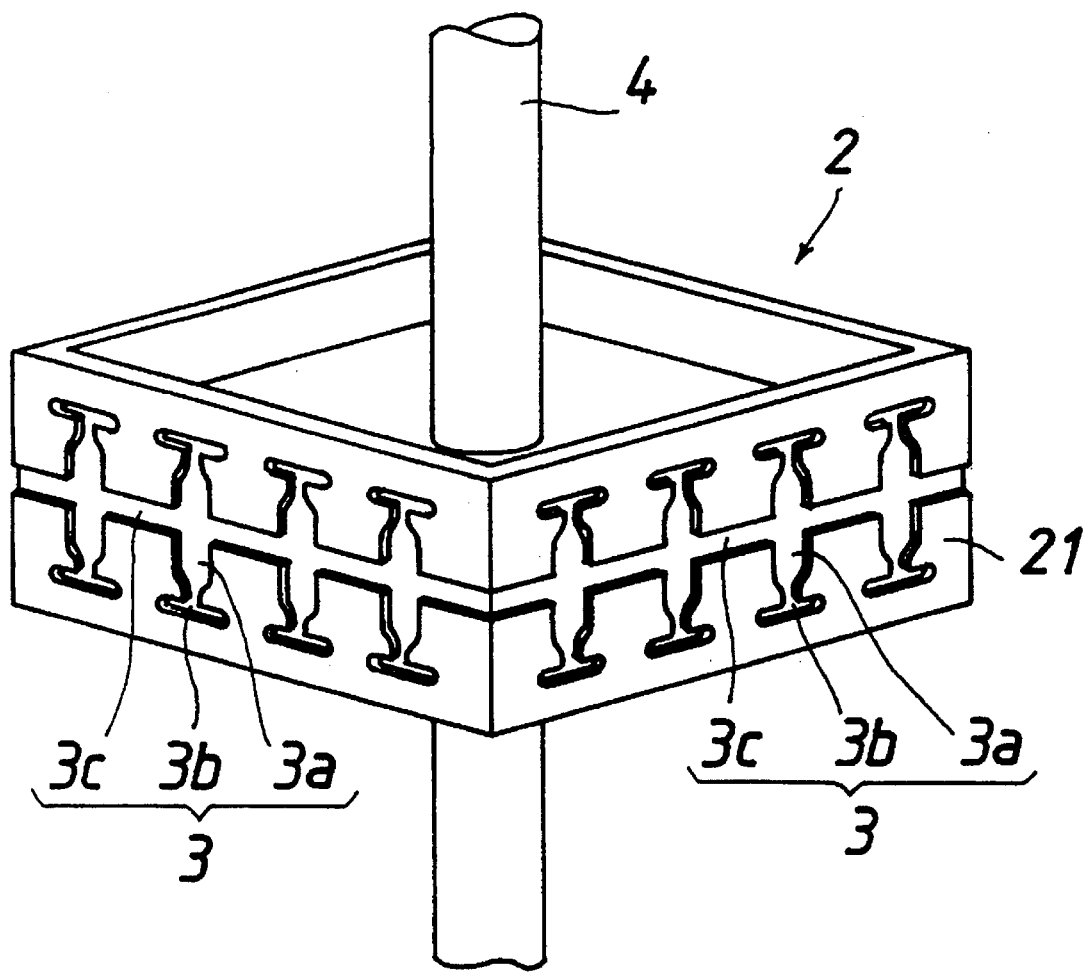
FIG. 3 is a perspective view showing a piston of a noncontacting type measuring machine of the first invention.

On the other hand, the piston 2 has a structure, as shown in FIG. 3, that a rod 4 projects vertically from the center of a square pillar body 21 having a rectangular cross section, the inside thereof being scooped from both end faces to form a so-called inside-bored form. Moreover, the draw groove 3 formed on the outer wall face is composed of a plurality of longitudinal grooves 3a arranged along the moving direction of the piston 2, blast grooves 3b linked to these longitudinal grooves 3a, and a horizontal groove 3c formed on the whole pheriphery of the outer wall face orthogonally crossing said longitudinal grooves, and the piston having this draw groove 3 is so constituted that it has a clearance 13a with the cylinder 10 having a width of from 3 to 10 μm, preferably from 3 to 4 μm.

Here, the reason why the width of said clearance 13a is from 3 to 10 μm is that if the width is smaller than 3 μm, a gas layer cannot be formed because too small of a clearance 13a is formed, and the piston 2 cannot be hydrostatically supported in the cylinder 10, on the contrary, if the width of the clearance 13a is larger than 10 μm, a gas layer strong enough for supporting the piston 2 cannot be formed, and the piston 2 cannot be hydrostatically supported in the cylinder 10.

However, it is not necessary to limit the shape of said piston 2 to be a square pillar body 21, but the piston 2 may be a columnar body or an elliptical body, so far as the draw groove 3 formed on the outer wall face of the piston 2 can form the gas layer over the whole periphery of the piston 2.

Furthermore, in the noncontacting type measuring machine 1 shown in FIGS. 1 and 2, a pressure control valve 9 is disposed in the upper pressurizing chamber 8, but it may be disposed in the lower pressurizing chamber 7, such that it may be included in either one pressurizing chamber, and the other pressurizing chamber may be linked to an inner hole 5a of the injection nozzle 5. Also, although the pressure control valve 9 is disposed adjacent to the upper pressurizing chamber 8, it is not necessarily abutting against the upper pressurizing chamber 8, but it is only necessary to be connected with the upper pressurizing chamber 8. However, when high precision is required, it is preferred to be disposed adjacent to the upper pressurizing chamber 8.

Furthermore, as a material composing the noncontacting type measuring machine 1 shown in FIGS. 1 and 2, metal and plastic can be used, however, by using ceramics, an excellent measuring machine 1 can be formed. For example, when a piston 2, a rod 4, a cylinder 10 and an injection nozzle 5 are formed by alumina ceramics, the weight thereof can be reduced to one third of that of a measuring machine made of metal, and the followability of the piston 2 can be greatly improved. Moreover, even when it is used at a high temperature, since the alumina ceramics has a small thermal expansion coefficient, the deformation of the measuring machine 1 is hardly caused, and it is excellent in the corrosion resistance compared to a metal and a plastic. Therefore, even when a gas other than air is used as a working medium, or for the measurement in a moist place, the measuring machine 1 is not corroded, thus it does not choose the measuring environment.

In addition, as the material of the measuring machine 1, not only the above-mentioned alumina ceramics, but also other ceramics such as zirconia ceramics, silicon carbide ceramics, silicon nitride ceramics and sapphire may be used.

Next, the pressure control valve 9 used in the noncontacting type measuring machine 1 according to the present invention will be described.

Figure 4:
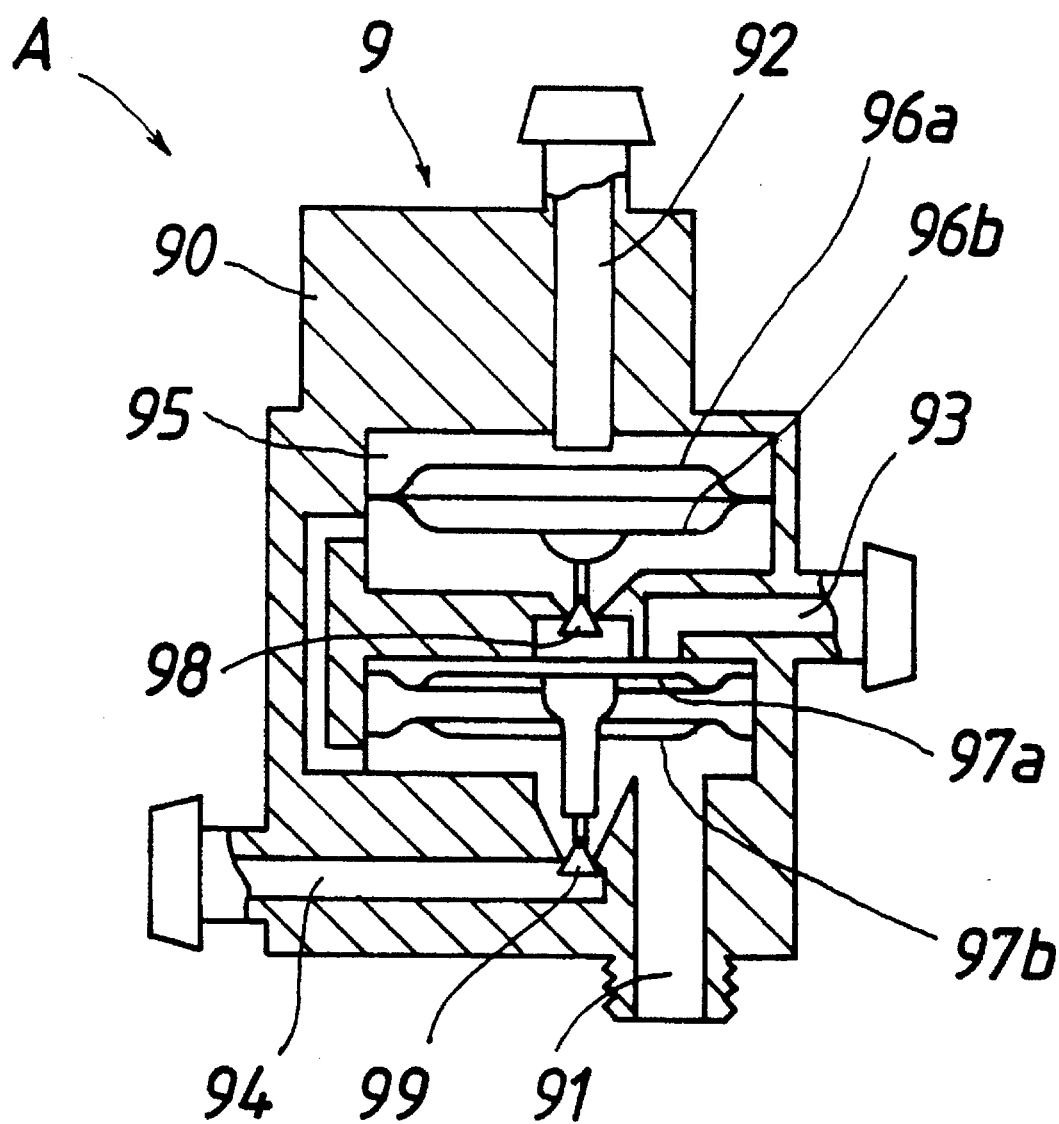
FIG. 4 is an enlarged sectional view showing A portion in FIG. 1.

The pressure control valve 9 is the one of a diaphragm type as shown in FIG. 4, comprising four ports, that is, an output port 91 provided on the outer frame 90 and linked to the upper pressurizing chamber 8 (not shown), an input port 92 for supplying the reference pressure, a discharge port 94 for discharging the pressure increased in the upper pressurizing chamber 8 (not shown), and a supply port 93 for pressurizing the pressure which has been decreased.

Among these four ports, the output port 91 and the discharge port 94 are linked to each other via a valve 99 connected to the diaphragm 97a and 97b, and the output port 91 is further linked to the control chamber 95. Furthermore, in the control chamber 95, diaphragms 96a and 96b are formed to divide the control chamber 95 into two chambers. Moreover, to said diaphragm 96b is connected a valve 98, through which the lower chamber of the control chamber 95 is linked to the supply port 93. In addition, the input port 92 is linked to the upper chamber of the control chamber 95.

Here, if a predetermined pressure is applied to the input port 92 and the supply port 93 of the pressure control valve 9 (always in a relation of the pressure of the input port 92<the pressure of the supply port 93), when the pressure in the upper pressurizing chamber 8 (not shown) becomes lower than the reference pressure from the input port 92, the diaphragm 96b in the control chamber 95 is pulled downward to open the valve 98 connected to said diaphragm 96b. Thereby, a gas is supplied from the supply port 93 to increase the pressure in the upper pressurizing chamber 8 (not shown) linked to the output port 91, and when this pressure becomes equal to the reference pressure of the input port 92, the valve 98 is closed. On the contrary, when the pressure in the upper pressurizing chamber 8 (not shown) becomes higher than the reference pressure from the input port 92, the valve 98 is completely closed, and the other diaphragm 97a is pushed downward by the pressure from the supply port 93, and the valve 99 connected to the diaphragm 97a opens to link the output port 91 and the discharge port 94, to discharge the pressurized portion from the discharge port 94.

Thus, since two pairs of diaphragms 96a, 96b, 97a and 97b can control subtle pressure balance, the upper pressurizing chamber 8 linked to the output port 91 of the pressure control valve 9 can be under the condition that the pressure therein is always adjusted to be equal to the pressure applied to the input port 92, even if the pressure is changed.

Furthermore, for the diaphragms 96a, 96b, 97a and 97b of said pressure control valve 9, generally a metallic material is used, and in a moist environment, there is a threat of causing rust, and when being used for a long time, there is a threat to be deformed due to the metallic fatigue by repetition of bending. Therefore, at this time, if a pressure control valve 9 in which said diaphragms 96a, 96b, 97a and 97b are formed by a partially stabilized zirconia ceramics having a high fracture toughness and an excellent flexural strength, as well as an excellent corrosion resistance is used, stable pressurization is made possible even if being used for a long period of time.

However, the pressure control valve 9 used in the measuring machine 1 according to the present invention is not limited to the ones having a structure shown in FIG. 4, but includes generally known pressure control valves, or a throttle valve for exhaust.

Incidentally, the throttle valve for exhaust means a valve having only the exhaust function, wherein the throttled volume is controlled by hand to set up the exhaust volume. Therefore, though the pressure in the upper pressurizing chamber 8 cannot be always controlled as in the pressure control valve 9 shown in FIG. 4, if it is a measurement in a short time, even a throttle valve for exhaust can maintain the pressure in the upper pressurizing chamber 8 approximately constant, whereby it is possible to use the throttle valve for exhaust.

Next, the operation of the measuring machine 1 of the present invention will be described.

For example, as shown in FIG. 1, the pressures, P1 and P2 are supplied to the supply port 93 and the input port 92 of the pressure control valve 9, respectively, and the pressure P3 is supplied from the supply port 11. However, these pressures have a relation of (P3>P1>P2), and when the pressure P2 applied to the input port 92 is assumed to be the reference pressure, the air layer is formed in the clearance 13a between the piston 2 and the cylinder 10 by the pressure P3 from the supply port 11, and the piston 2 is hydrostatically supported in the cylinder 10, a part of the pressure P3 supplied from the supply port 11 leaks to each pressurizing chamber 7 and 8, and the leak pressure flown into the lower pressurizing chamber 7 is to be injected from the injection nozzle 5 via the tubular body 15.

Furthermore, in the upper pressurizing chamber 8, the leak pressure from the supply port 11 flows in to cause the pressure change, but the upper pressurizing chamber 8 is maintained always to be the pressure P2, which is the reference pressure, by the pressure control valve 9.

When the object to be measured 50 is brought close to the injection nozzle 5, the back pressure from the object to be measured 50 is taken into the lower pressurizing chamber 7 of the cylinder 10 through the inner hole 5a of the injection nozzle 5 to raise the piston 2 upward with the increase of the pressure. If the pressure in the lower pressurizing chamber 7 is assumed to be P4, and the object to be measured 50 is brought closer to the injection nozzle 5, when the reference pressure P2 by the pressure control valve 9 and the pressure P4 in the lower pressurizing chamber 7 are balanced, the piston 2 stops, and the injection nozzle 5 stands still in a state of keeping a certain distance from the object to be measured 50.

At this time, by measuring the value of the electric micrometer 6 as the reference value, the measurement preparation is completed.

Then, when the measuring machine 1 is moved from side to side, since the piston 2 of the measuring machine 1 moves vertically along the surface shape of the object to be measured 50, the linearity and the planeness of the object to be measured 50 can be measured by measuring the displacement of the piston 2 with the electric micrometer 6. This is because the inside of the cylinder 10 is in a kind of sealed state, and when there is a convex portion on the surface of the object to be measured 50, the back pressure increases to increase the pressure P4 in the lower pressurizing chamber 7, the balanced state with the reference pressure P2 is destroyed, and the piston 2 is moved upward until the balanced state is again obtained. The displacement of the piston 2 at this time corresponds to the increased amount of the back pressure, and further to the height of the convex portion on the surface of the object to be measured 50.

On the contrary, when there is a concave portion on the surface of the object to be measured 50, the back pressure decreases to destroy the balanced state with the reference pressure P2 of the upper pressurizing chamber 8, and the piston 2 is moved downward by the decreased amount of the back pressure to stand still, thus the injection nozzle 5 and the object to be measured 50 are always kept at a certain distance, whereby displacement of the piston 2 shows directly the surface condition of the object to be measured 50.

Thus, in the noncontacting type measuring machine 1 of the present invention, since the piston 2 is hydrostatically supported, the piston 2 does not have any sliding resistance, and the air is injected from the injection nozzle 5 by using the leak pressure flowing into the lower pressurizing chamber 7. The back pressure from the object to be measured 50 is taken directly into the lower pressurizing chamber 7 to move the piston 2, whereby the responding property of the piston 2 becomes excellent and there is almost no difference in the measured value.

Furthermore, since the pressure change in the upper pressurizing chamber 8 can be set up so that always a certain reference pressure can be maintained by the pressure control valve 9, there is no need to design the measuring machine 1 considering the sealability as in the conventional measuring machine.

Next, other Examples will be described.

Figure 5:
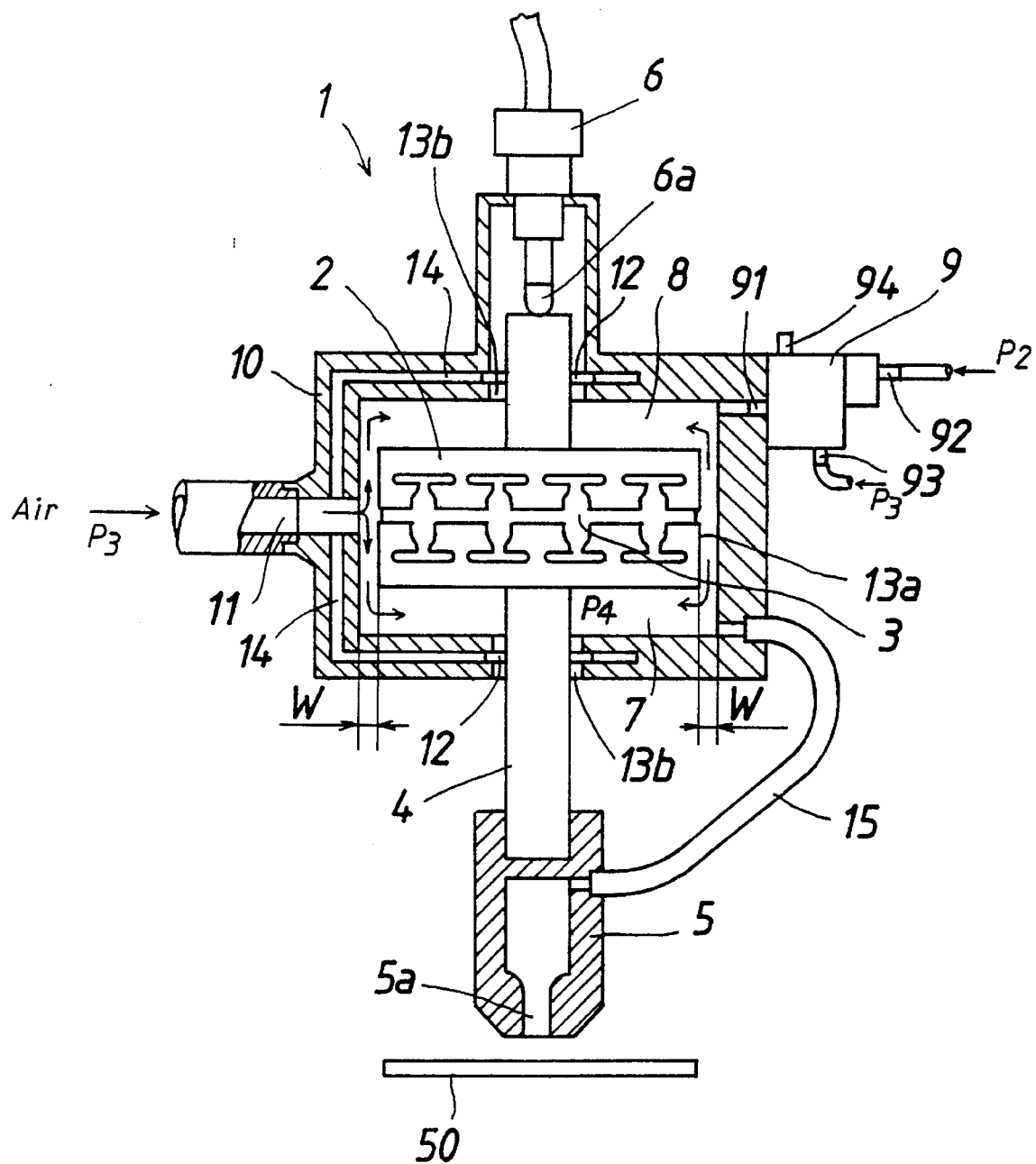
FIG. 5 is a longitudinally sectional view showing another embodiment of the noncontacting type measuring machine of the first invention.

FIG. 5 shows a measuring machine 1 in which a fluid passage 14 is provided to the cylinder 10 to supply the air pressure from the supply port 11 also to the clearance 13b between the rod 4 and the cylinder 10.

By making the measuring machine 1 with such a structure, a kind of hydrostatic bearing 12 can be formed in the clearance 13b between the rod 4 and the cylinder 10. Since the rod 4 can be supported by two hydrostatic bearings 12 on both sides of the piston 2, the rolling of the rod 4 can be prevented, and the movement of the piston 2 can be made more stable, having a sealing effect, too. And, in the lower pressurizing chamber 7 linked to the injection nozzle 5, as the leak pressure from the hydrostatic bearings 12 flows in, higher pressure can be secured, and the pressure can be injected to the object to be measured 50, whereby the pressure change rate between the injection pressure from the injection nozzle 5 and the back pressure from the object to be measured 50 can be increased to make the measuring machine 1 have an excellent sensitivity.

Figure 6:
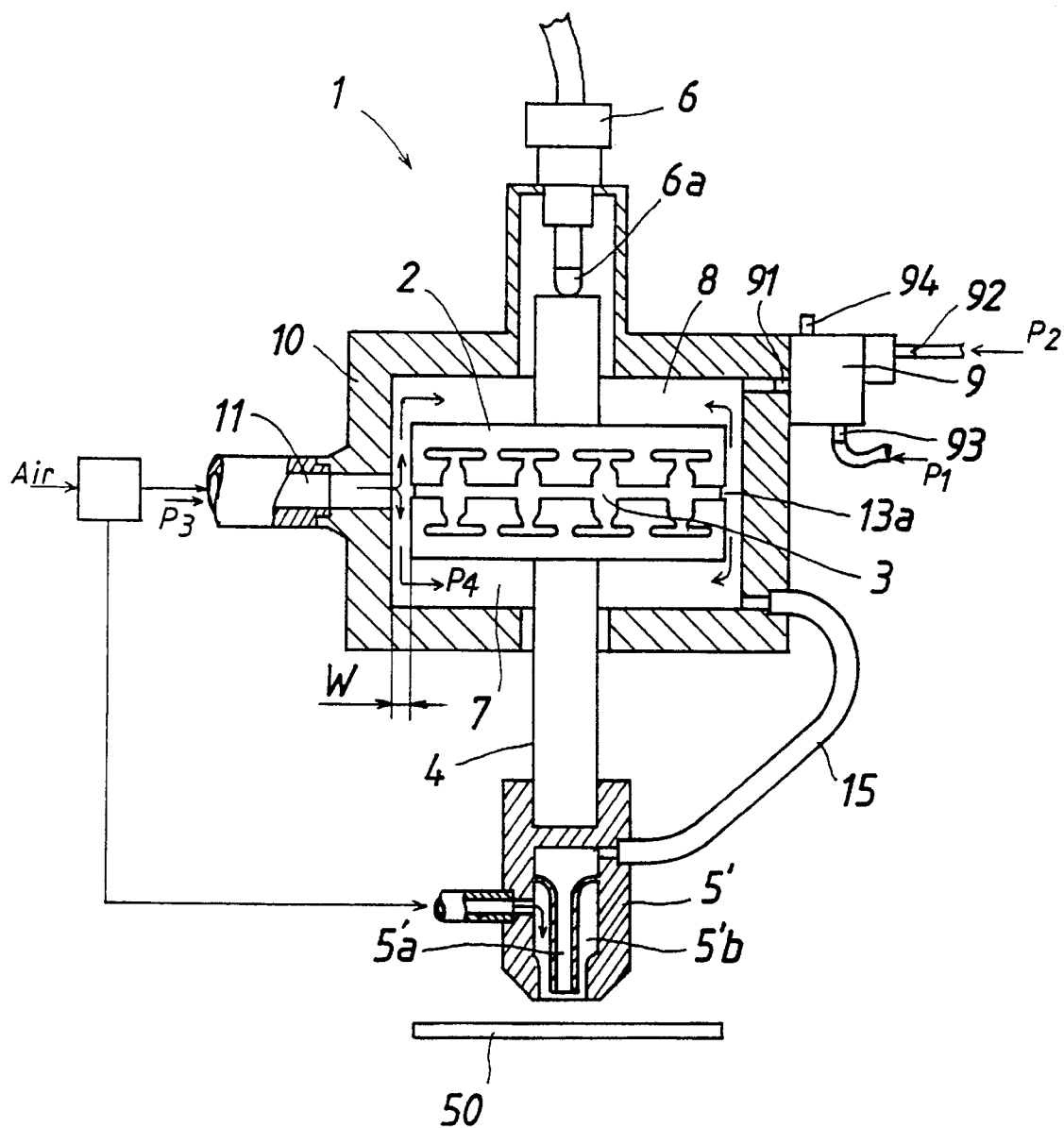
FIG. 6 is a longitudinally sectional view showing other embodiment of the noncontacting type measuring machine of the first invention.

Furthermore, in the measuring machine 1 shown in FIG. 6, an injection nozzle 5' having double holes is attached to the tip of the rod 4 instead of the injection nozzle in FIG. 1 to increase the injection force of the injection nozzle 5' by supplying the pressure separately from the outer hole 5'b of the injection nozzle 5'. Thereby, the pressure change rate between the injection pressure and the back pressure can be increased to improve the sensitivity of the measuring machine 1. Moreover, in the case where an object to be measured 50 easy to be deformed is measured, by adjusting the air pressure supplied to the outer hole 5'b of the injection nozzle 5', the measurement can be carried out with optimum measuring sensitivity, without deforming the object to be measured 50.

Furthermore, by a measuring machine 1 with a structure having both parts shown in FIGS. 5 and 6, the similar effect can be obtained, and by using these structure selectively depending on the property of the object to be measured 50, measurement with higher precision can be performed.

Furthermore, in the noncontacting type measuring machine 1 according to the present invention, as a method to link the lower pressurizing chamber 7 and the injection nozzle 5, a fluid passage may be formed in the rod 4 to directly link the lower pressurizing chamber 7 to the inner hole 5a of the injection nozzle 5. Alternatively, as a detecting means for measuring the displacement of the piston 2, a linear scale may be arranged along the moving direction on the outer wall face of the piston 2, and a luminescent device may be arranged on the side wall of the cylinder 10 to read optically the scale of the linear scale, and a linear encoder and the like for detecting the displacement of the piston 2 may be used.

Experiment

With respect to the difference in the measured value and the linearity of the whole measuring strokes, an experiment is conducted by using the measuring machine 1 of the present invention shown in FIG. 1.

The main dimension of the measuring machine 1 is as shown below:

Piston 2: Section: 20×100 mm,
Pressure-receiving area: 20 cm$^2$
Injection nozzle 5: Area of inner hole: 4.15 mm$^2$
Measuring stroke: 10 mm Then, a pressure of 0.7 kg/cm$^2$ was supplied to the supply port 11 of said measuring machine 1, and a pressure of 0.34 kg/cm$^2$ was input to the input port 92 of the pressure control valve 9, and the measurement was conducted by reciprocating and moving the measuring machine over the object to be measured having a surface shape as shown by a solid line in FIG. 7. And the measuring condition was that 10 points was taken per 10 mm pitch on one way. The results are shown by a dotted line and an one-point chain line in Table 1 and FIG. 7. (However, the solid line which shows the surface shape of the object to be measured is shifted from the center of the graph, and the dotted line shows the difference in the measured value and the one-point chain line shows the average measured value.)

TABLE 1

| Measured point 10 mm pitch | Measured average value (μm) | Difference width (μm) |
|---|---|---|
| 0 | 0.00 | 0.00 |
| 1 | 0.01 | 0.09 |
| 2 | 0.07 | 0.06 |
| 3 | 0.16 | 0.06 |
| 4 | 0.19 | 0.06 |
| 5 | 0.16 | 0.09 |
| 6 | 0.13 | 0.06 |
| 7 | 0.08 | 0.09 |
| 8 | 0.05 | 0.06 |
| 9 | 0.01 | 0.09 |
| 10 | 0.00 | 0.00 |

Figure 7:
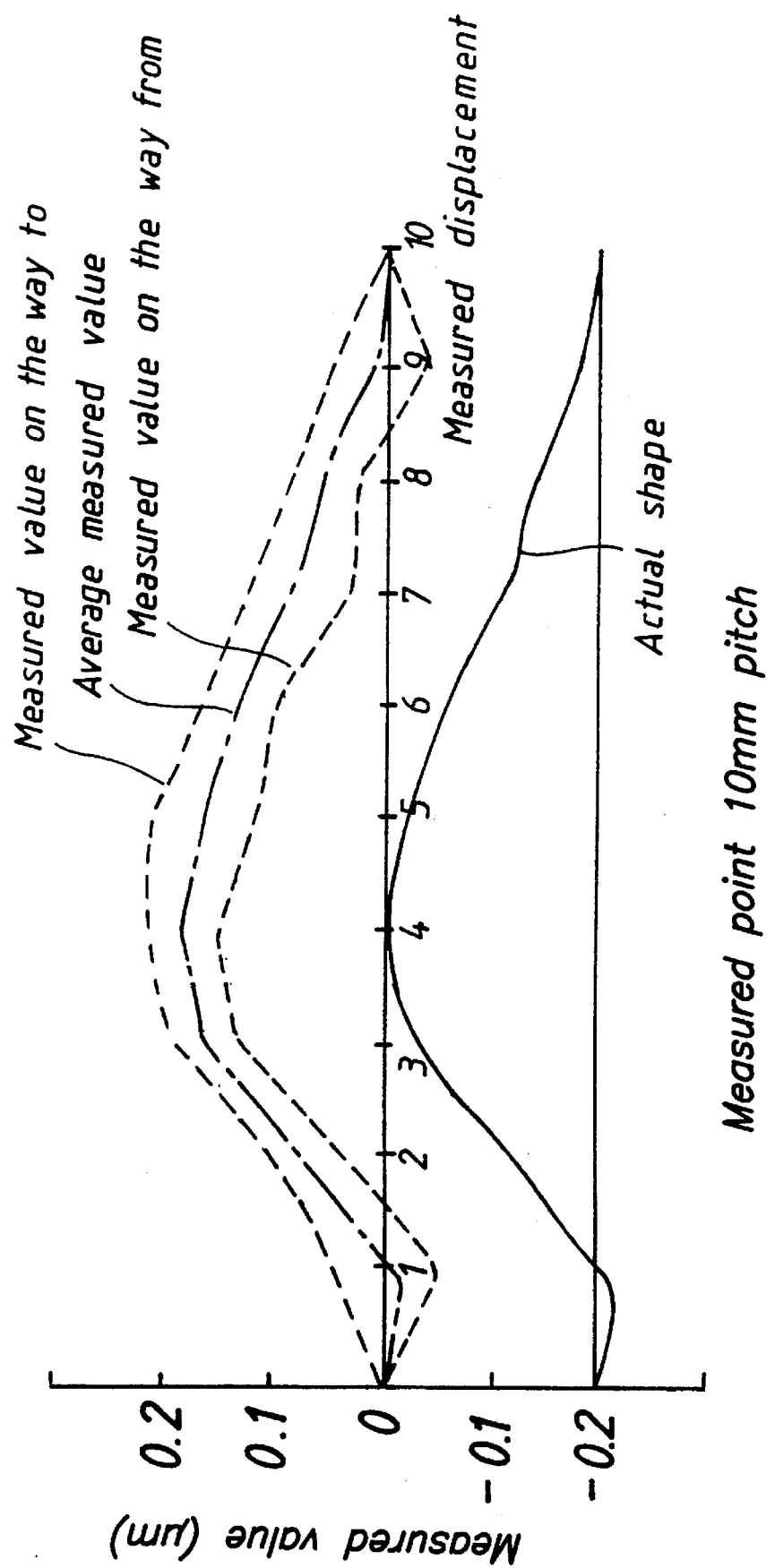
FIG. 7 is a graph showing the measured value and the difference width thereof when being measured using the noncontacting type measuring machine of the first invention.

As seen from the FIG. 7 and Table 1, the average measured value seems to be approximately tracing the surface of the object to be measured. And it was found that the difference width of the measured value was below 0.09 μm or below at most, showing that there was almost no difference.

Then, block gages having a thickness of 1 mm were piled one by one to measure the linearity when the measuring stroke was changed from 1 mm to 10 mm. The result is as shown in FIG. 8.

Figure 8:
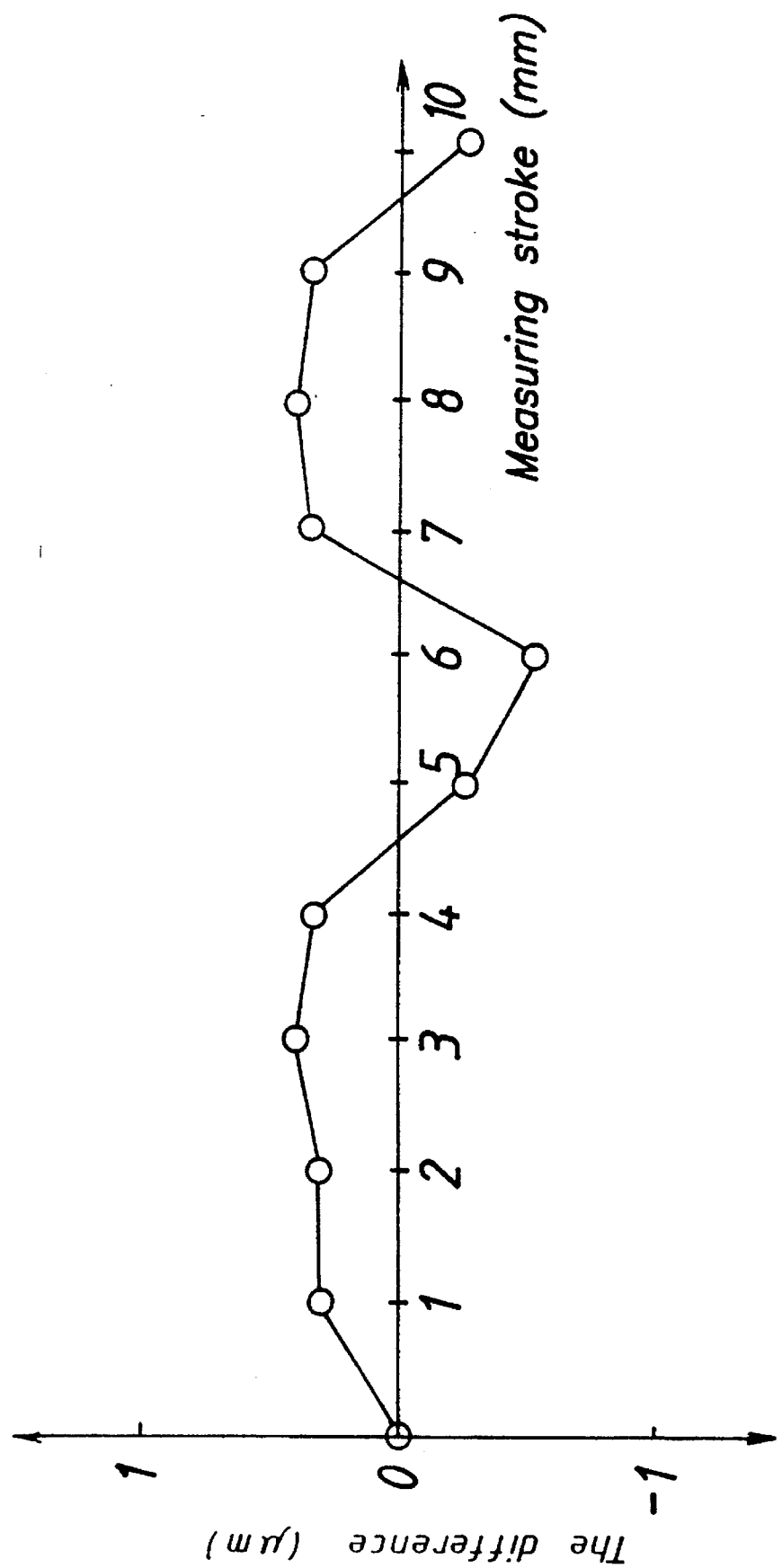
FIG. 8 is a graph showing the linearity of the noncontacting type measuring machine of the first invention.

As seen from FIG. 8, even when the block gage having a height of 6 mm which was the largest divergence measured, the detected value was 5.9995 mm which was an error of only 1/2000, and in other measuring strokes, the error was less than the above error, which showed the excellent linearity.

The noncontacting type measuring machine of the first invention has a structure that the piston is hydrostatically supported in the cylinder, whereby the sliding resistance caused at the time of movement of the piston is as good as nonexistent. Therefore, the piston has a good actuation, and since it can move freely and smoothly, and the friction heat is not generated, the gas which is the working medium is not expanded and there is no difference in the movement of the piston.

Furthermore, in the pressurizing chamber with the pressure control valve, even if the leak pressure flows in from the supply port, since it has a pressure control valve, the pressurizing chamber can be set up to have always a certain reference pressure.

In a pressurizing chamber which does not have a pressure control valve, it is linked to the injection nozzle, whereby the leak pressure of the pressure supplied in order to hydrostatically support the piston can be injected directly from the injection nozzle, and the back pressure from the object to be measured is directly taken into the lower pressurizing chamber to move the piston, thus it is excellent in the responding property. Therefore, the noncontacting type measuring machine of the first invention can perform high-precision measurement such that it responds even against the change of quite minute back pressure.

Figure 9:
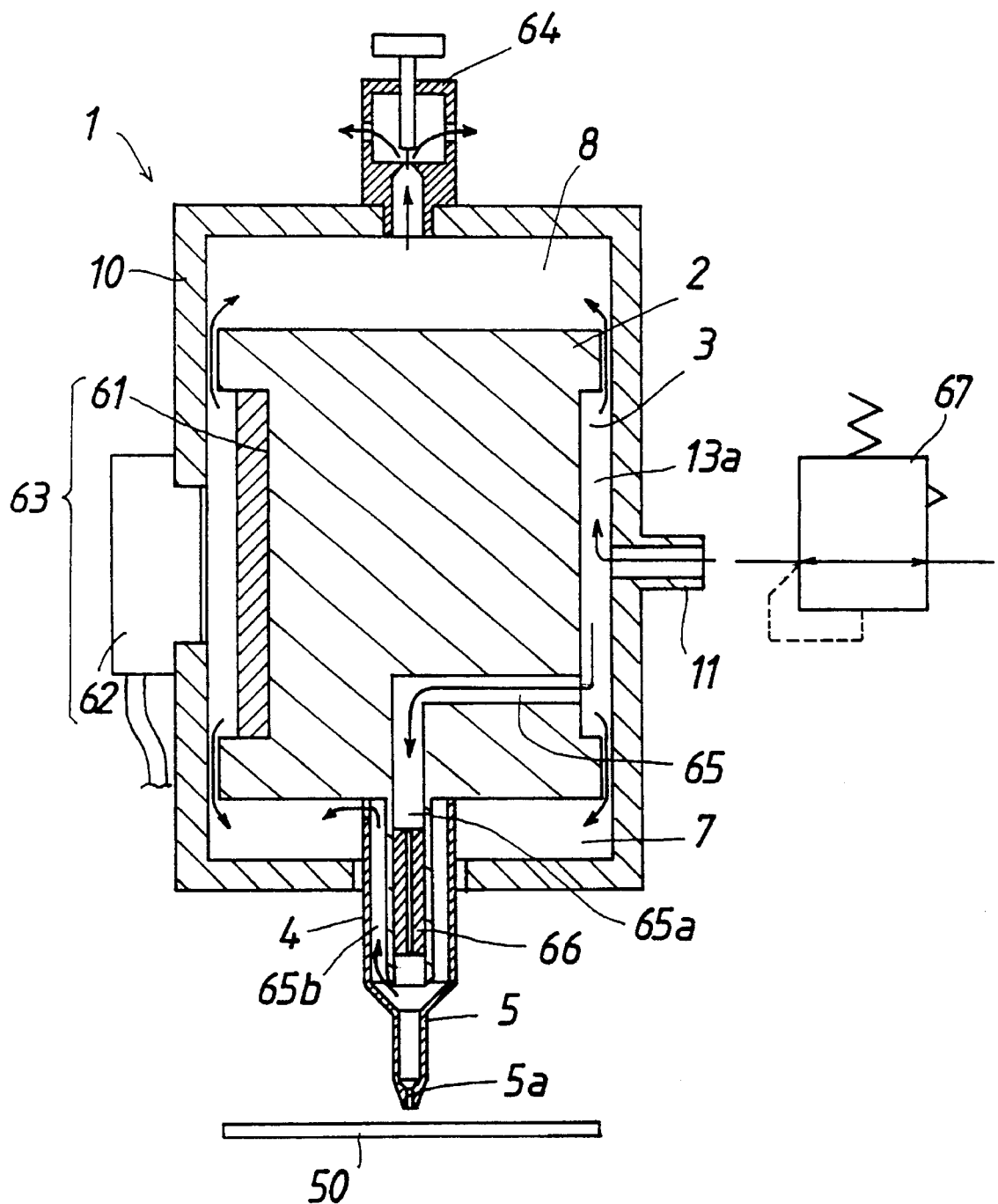
FIG. 9 is a longitudinally sectional view of a noncontacting type measuring machine of the second invention by improving the first invention to make the structure simple.

A noncontacting type measuring machine according to the second invention is shown in FIG. 9.

A piston 2 having a draw groove 3 on the outer wall face and having a rod 4 projecting only at one end is inserted to the cylinder 10, and an injection nozzle 5 having an inner hole 5a is attached at the tip of said rod 4.

Moreover, double holes are provided in said piston 2 and the rod 4, and at the tip of the inner hole 65a, a drawing portion 66 is provided and the back end portion thereof is linked to the draw groove 3 formed on the outer wall face of the piston 2, while the back end portion of the outer hole 65b is extended to the root portion of the rod 4 to be linked to the lower pressurizing chamber 7 formed putting the piston 2 therebetween.

Furthermore, in the upper part of the cylinder 10, a throttle valve for exhaust 64 is attached instead of the pressure control valve used in said first invention in order to maintain the pressure in the upper pressurizing chamber 8 approximately constant, and a supply port 11 for supplying the gas to hydrostatically support the piston 2 is provided on the side wall of the cylinder 10.

And, as a detecting means for measuring the displacement of the piston 2, a linear scale 61 is arranged along the moving direction of the piston 2 on the outer wall face of the piston 2, and a scale head 62 of a luminescent device is arranged on the side wall of the cylinder 10 to read optically the scale of the linear scale 61, and a linear encoder 63 of the piston 2 is used.

The measuring machine of the second invention has a structure that an inner hole 65a circulating from the outer wall face of the piston 2 to the injection nozzle 5 is provided, and a gas pressure from the supply port 11 is taken in from said inner hole 65a to be injected from the injection nozzle 5, whereby the injection pressure can be increased compared to that of the measuring machine 1 of said first invention. Therefore, the pressure change rate between the injection pressure and the back pressure can be increased to make a measuring machine have an excellent sensitivity.

Furthermore, since a drawing portion 66 is provided at the tip of the inner hole 65a, it can prevent a quantity of gas from flowing out from the inner hole 65a.

Namely, by providing an inner hole 65a, a quantity of gas flows out to make it impossible to form a gas layer in the clearance 13a between the piston 2 and the cylinder 10, and thus it becomes impossible to hydrostatically support the piston 2, but in the second invention, since a drawing portion 66 is provided at the tip of the inner hole 65a, it can prevent a quantity of gas from flowing out, and a gas layer is formed in the clearance 13a between the piston 2 and the cylinder 10 to hydrostatically support the piston 2.

Furthermore, in the first invention, the lower pressurizing chamber 7 is linked to the injection nozzle 5 through a tubular body 15, but in the second invention, the lower pressurizing chamber 7 and the injection nozzle 5 are linked via an outer hole 65b of the rod 4, whereby the tubular body 15 is not required to make the structure simple and make the measuring machine 1 per se down-sized.

Furthermore, by supplying the gas pressure to the supply port 11 via a regulator 67, it becomes possible to supply the gas pressure stably.

In addition, the measuring machine 1 of the second invention shown in FIG. 9 has a structure that the outer hole 65b provided in the rod 4 is linked to the lower pressurizing chamber 7, but the outer hole 65b may be extended further to pass through the inside of the piston 2 to be linked to the upper pressurizing chamber 8, and in this case, the throttle valve for exhaust 64 may be attached to the lower pressurizing chamber.

Furthermore, in the measuring machine 1 of the second invention shown in FIG. 9, double holes are provided in the piston 2 and the rod 4, they may have a single hole and an injection nozzle 5 having double holes may be provided as an injection nozzle 5. At this time, with regard to the holes provided in the piston 2 and the rod 4, one hole of the injection nozzle 5 may be linked to the outer wall face of the piston 2, and the other hole of the injection nozzle 5 may be linked to the lower pressurizing chamber 7 via a tube as in the first invention shown in FIG. 1.

Furthermore, as other detecting means for detecting the displacement of the piston 2, an electric micrometer 6 used in the first invention may be used.

Thus, the noncontacting type measuring machine of the second invention has a very simple structure and is easy to be used practically.

Next, the third invention will be described.

Figure 10:
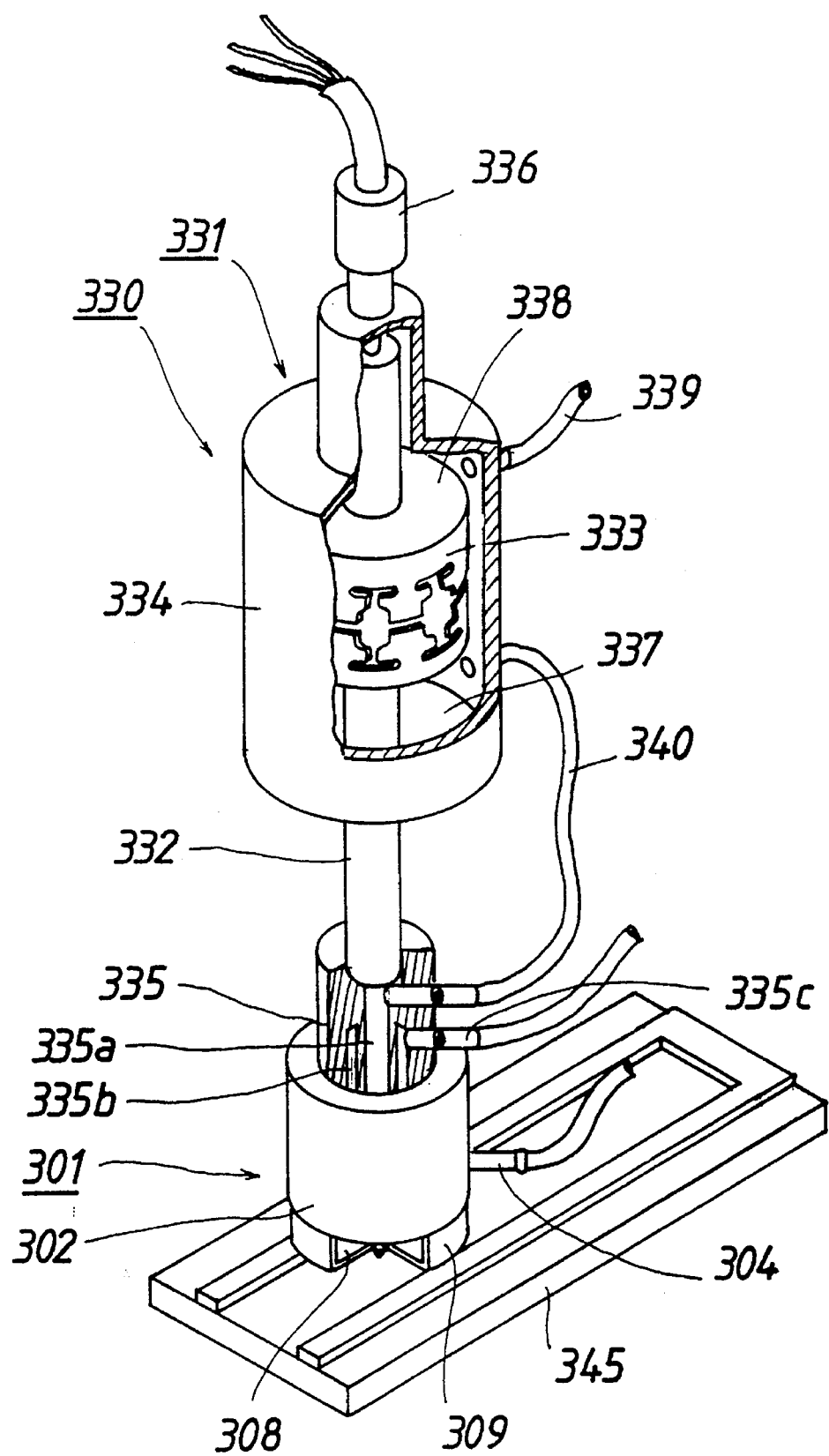
FIG. 10 is a perspective view showing a measuring machine according to the third invention, a part thereof being broken.
Figure 11:
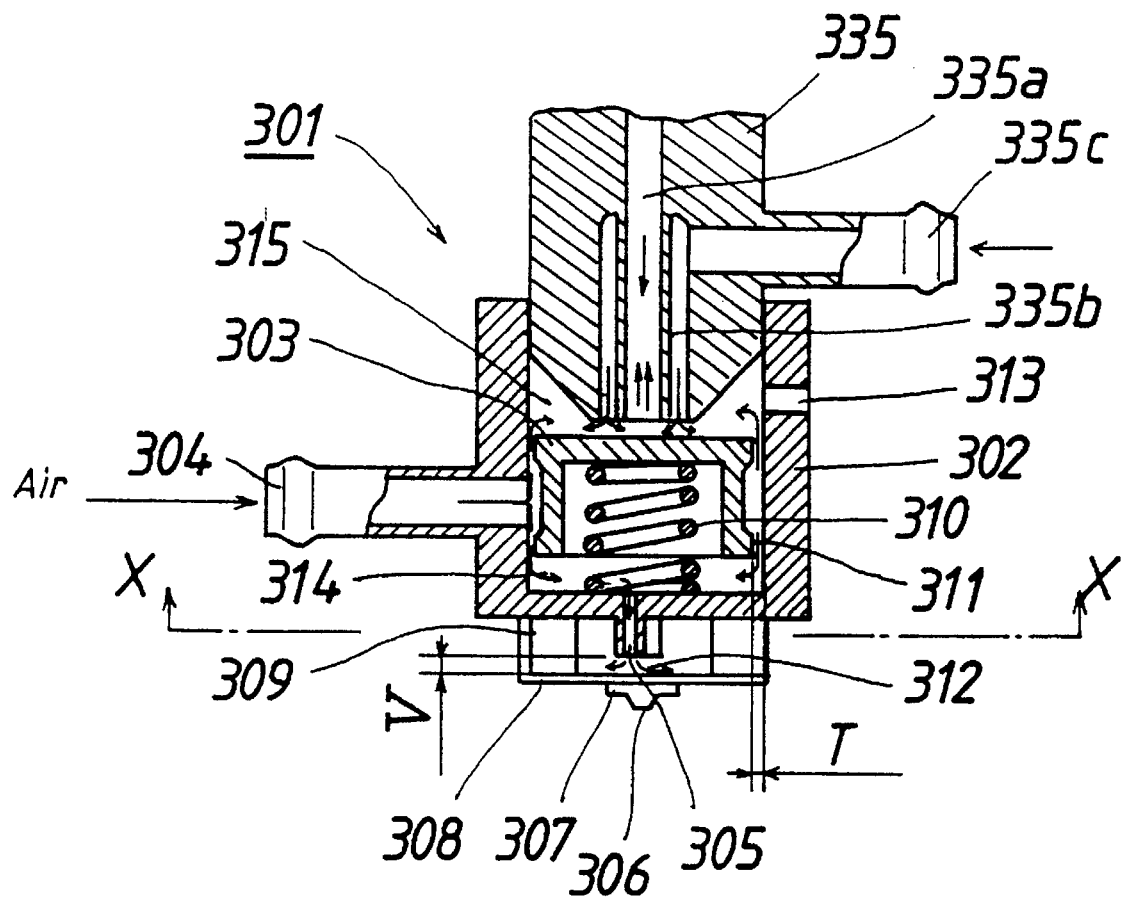
FIG. 11 is a longitudinally sectional view showing the detecting member of a measuring machine according to the third invention.

FIG. 10 is a perspective view of a measuring machine 330 according to an example of the present invention, a part of which is broken. FIG. 11 is a longitudinally sectional view showing a detecting member 301 which is a main part of FIG. 10.

The measuring machine 330 of the example of the third invention has a structure that a detecting member 301 is attached to the tip portion of the injection nozzle 335 of the noncontacting type measuring machine 331 of a gas injection style by a means such as a bolt or a screw (not shown).

In said noncontacting type measuring machine 331, among two pressurizing chambers formed in the cylinder 334 putting the piston 333 therebetween, one pressurizing chamber is made to be the reference pressurizing chamber 338, to which a gas pressure which is to be the reference pressure is supplied from the gas supply port 339, and the other pressurizing chamber 337 is connected to the inner hole 335a of the injection nozzle 335 (hereinafter referred to as a "nozzle") attached at the tip of the rod 332 projecting from the piston 333 via a tube 340.

Furthermore, said nozzle 335 is provided with an outer hole 335b on the outer periphery of the inner hole 335a, a gas supply port 335c being linked to the outer hole 335b, and the gas pressure supplied from said gas supply port 335c is injected from the outer hole 335b to take in the back pressure thereof from the inner hole 335a to the pressurizing chamber 337. Also, at the back end side of the rod 332, an electric micrometer 336 for measuring the displacement of the piston 333 is attached to the cylinder 334.

The working principle of the noncontacting type measuring machine 331 per se is that if the reference pressure is supplied to the pressurizing chamber 338 from the gas supply port 339, and the gas pressure is also supplied to the gas supply port 335c of the nozzle 335 to be injected from the tip of the nozzle 335 to the object to be measured 345, the back pressure from the object to be measured 345 is taken into the pressurizing chamber 337 through the inner hole 335a of the nozzle 335, and the piston 333 stands still at the position where the pressures in the upper pressurizing chamber 338 and the lower pressurizing chamber 337 are balanced, and the nozzle 335 stands still keeping a certain distance with the object to be measured 345. Here, if the object to be measured 345 is moved, the back pressure taken from the nozzle 335 is changed due to the surface shape thereof, and with this pressure change, the piston 333 automatically follows, and the nozzle 335 moves vertically keeping a certain distance along the surface shape of the object to be measured 345, the moving volume of this nozzle 335 being detected by the electric micrometer 336 to make it possible to measure the surface shape of the object to be measured 345.

On the other hand, the detecting member 301 disposed in the nozzle 335 of said noncontacting type measuring machine 331 comprises a spring 310 on the bottom face of the inner hole of the cylinder 302, and a piston 303 supplementarily supported by said spring 310, and the lower chamber separated by said piston 303 is assumed to be an input chamber 314, and the upper chamber is assumed to be an output chamber 315.

Incidentally, it had better not use the spring 310 for the high sensitivity, but if the spring 310 is not used, there may be caused vibrations.

Figure 12:
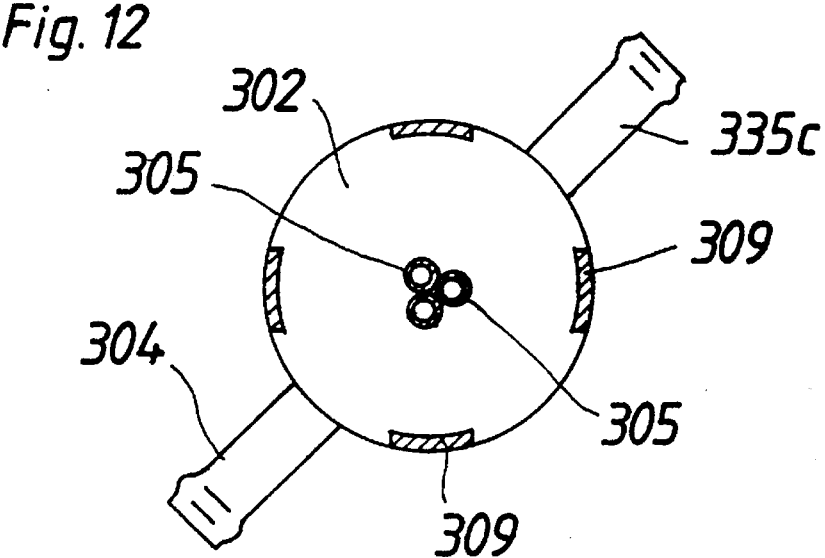
FIG. 12 is a sectional view of a detecting member of the measuring machine according to the third invention, along the line X—X.
Figure 13:
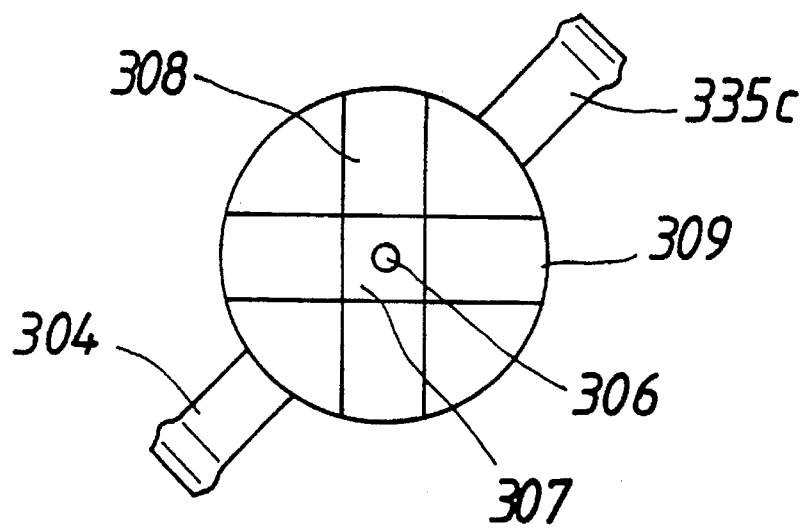
FIG. 13 is a bottom view of the detecting member of the measuring machine according to the third invention.
Figure 14:
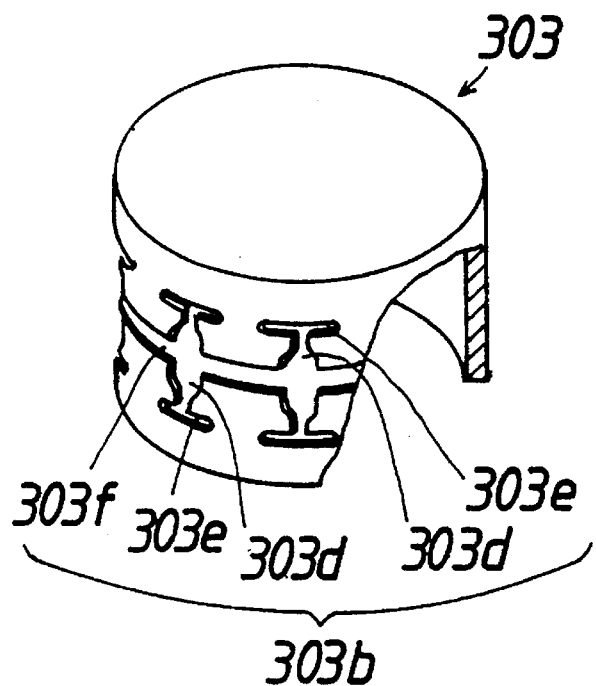
FIG. 14 is a perspective view of a piston, a part of which being broken, provided to the detecting member of the measuring machine according to the third invention.

Furthermore, on the side wall of said cylinder 302, there are respectively provided a gas supply port 304 for hydrostatically supporting said piston 303 and an exhaust port 313 for releasing the pressure in the output chamber 315, and at the center of the tip face of the cylinder 302, a gas injection hole 305 is provided in which three holes as shown in FIG. 12 are provided close-packed. Moreover, at the tip portion of the cylinder 302, four plate-like bodies 309 are provided every 90 degrees along the circumferential direction, and at the tip portion of said plate-like bodies 309, a cruciform film 308 as shown in FIG. 13 is attached to the gas injection hole 305 with a clearance 312. At the center portion of this film 308, a pressure-receiving plate 307 made of ceramic having a probe 306 composed of a diamond, a sapphire or the like is attached. These film 308, pressure-receiving plate 307 and probe 306 form a movable portion.

The working principle of this detecting member 301 is that when a probe 306 is moved in contact with the surface of the object to be measured 345, the probe 306 moves vertically corresponding to the surface shape of the object to be measured 345, the moving volume thereof being converted to the displacement volume of the back pressure generated by the pressure-receiving plate 307, which is transmitted to the nozzle 335 of said noncontacting type measuring machine 331 via the piston 303.

On the outer wall face of the piston 303 provided in said detecting member 301, a draw groove 303$b$ is formed composed of a plenty of longitudinal grooves 303$d$ arranged along the moving direction of the piston 303, blast grooves 303$e$ linked to these longitudinal grooves 303$d$, and a horizontal groove 303$f$ formed on the whole pheriphery of the outer wall face orthogonally crossing said longitudinal grooves 303$d$, and a clearance 311 having a width of from 3 to 10 µm, preferably from 3 to 4 µm is provided between the piston 303 having this draw groove 303$b$ and the cylinder 302.

Here, the reason why the width T of said clearance 311 is to be from 3 to 10 µm is that if the width T is smaller than 3 µm, a gas layer cannot be formed in the whole periphery of the clearance 311 between the piston 303 and the cylinder 302 because of too small width T of the clearance 311, and the piston 303 cannot be hydrostatically supported, and on the contrary, if the width T of the clearance 311 is larger than 10 µm, a gas pressure injected from the gas supply hole 304 is weakened up to the draw groove 303$b$ of the piston 303, and the piston 303 cannot be hydrostatically supported.

Incidentally, the draw groove 303$b$ of the piston 303 may have any shape which can form an uniform gas layer in the clearance 311 between the cylinder 302 and the piston 303.

Furthermore, at said detecting member 301 though a clearance 312 is provided between the gas injection hole 305 and the pressure-receiving plate 307, this clearance 312 should be formed with a width V of from 10 to 100 µm. Namely, if the width V of the clearance 312 is smaller than 10 µm, and if there is a convex portion on the surface of the object to be measured 345, the pressure-receiving plate 307 instantaneously pushed upward is brought into contact with the gas injection hole 305, whereby there may be caused a measurement error. On the contrary, if the width V of the clearance 312 is larger than 100 µm, all the gas pressure injected from the gas injection hole 305 is released into the air to make it impossible to detect the back pressure from the pressure-receiving plate 307, whereby the measurement cannot be conducted.

Furthermore, although the gas injection hole 305 of said detecting member 301 is composed of three holes so as to keep the pressure-receiving plate horizontal, the number of holes are not particularly limited, and holes more than one may be provided depending on the size of the pressure-receiving plate 307.

Furthermore, the movable portion composed of a probe 306, a pressure-receiving plate 307 and a film 308 may be arranged anyhow in the plate-like body 309, and the arrangement method and the number of the plate-like body 309 are not particularly limited, but it is required to be arranged so that it has a clearance 312 of the above range between the gas injection hole 305 and itself, and it should have a structure that a part of the gas pressure from the gas injection hole 305 can be released to the air.

On the other hand, as a material of the cylinder 302, piston 303 and pressure-receiving plate 307 which compose this detecting member 301, there may be used a resin and a plastic, but it is preferred to be formed by ceramics. For example, a cylinder 302, a piston 303 and a pressure-receiving plate 307 formed by alumina ceramics, zirconia ceramics, silicon carbide ceramics, or silicon nitride ceramics are excellent in chemical resistance and heat resistance, whereby even in a measurement at a high temperature, under a moist environment, or using a corrosive gas, any deformation of the detecting member 301 or rust is not caused. Moreover, since the specific gravity is small, the piston 303 has an excellent sensitivity even against a minute pressure, and the pressure-receiving plate 307 is suitable for reducing the contact pressure with the object to be measured 345, whereby excellent detecting member 301 can be obtained.

In addition, as a material forming said detecting member 301, needless to say that it is not limited to the abovementioned ceramics, but the one composed of other ceramics may be used.

For the film 308 for arranging the pressure-receiving plate 307 at the tip of the gas injection hole 305, it is desired to use a material having a resistance against bending and a small specific gravity, preferably stainless and polyethylene, and more preferably, zirconia ceramics having a high fracture toughness and excellent flexural strength.

Next, the working principle of the measuring machine 330 according to the present invention will be described with reference to FIGS. 10 and 11.

First, the noncontacting type measuring machine 1 is actuated, and when a gas pressure is injected from the nozzle 335 to the piston 303 of the detecting member 301, and a gas pressure is also supplied from the gas supply port 304 of the detecting member 301, the piston 303 inserted into the detecting member 301 is hydrostatically supported without being supported by the spring 310, and a part of the gas pressure flown into the output chamber 315 and a part of the gas pressure injected from the nozzle 335 are released to air from the exhaust hole 313, while the gas pressure flown into the input chamber 314 is injected from the gas injection hole 305 to the pressure-receiving plate 307. Here, when the probe 306 provided to the pressure-receiving plate 307 is brought into contact with the object to be measured 345, the pressure-receiving plate 307 is pushed upward to take in the back pressure from the pressure-receiving plate 307 to the input chamber 314. And, the piston 303 moves to and stands still at the position where the force which pushes the piston 303 by the back pressure and the force which pushes the piston 303 by the gas pressure injected from the nozzle 335 of the noncontacting type measuring machine 331 become equal. At this time, the back pressure from the piston 303 is also taken into the noncontacting type measuring machine 331.

Then, the object to be measured 305 is moved, and when the probe 306 of the detecting member 301 comes to the convex portion of the object to be measured 345, the pressure-receiving plate 307 is pushed by the height of the convex portion, whereby the back pressure taken into the input chamber 314 is raised, and the piston 303 goes upward to the position where the forces affecting the piston 303 are balanced. At this time, as the piston 303 goes upward, the back pressure taken into the noncontacting type measuring machine 331 increases, whereby the piston 333 automatically follows and moves, and is controlled so that the contact pressure with the object to be measured 345 is maintained always constant, and the moving volume of this piston 333 is measured by an electric micrometer 336, and when the probe 306 of the detecting member 301 comes to the concave portion of the object to be measured 345, the reverse action is performed to measure.

Furthermore, the measuring machine 330 of the present invention has a function as an amplifier in the detecting member 301, and the amplified rate is determined by the area ratio of the area of the lower face of the piston 303 to the effective area of the outer hole 335b of the nozzle 335. For example, the area of the lower face of the piston 303 is assumed to be A, and the effective area of the outer hole 335b of the nozzle 335 is assumed to be B, the amplified rate will be A/B, and the back pressure amplified to A/B from the back pressure from the pressure-receiving plate 307 can be taken into the noncontacting type measuring machine 331, whereby measurement can be conducted even against the minute back pressure, and a measuring machine 330 having a high reliability can be provided.

Thus, the measuring machine 330 of the third invention converts the moving volume of the pressure-receiving plate 307 which moves vertically along the shape of the object to be measured 345 to the gas pressure, and this gas pressure is transmitted to the noncontacting type measuring machine 331 and is detected. Furthermore, if the gas pressure supplied to the gas supply port 304 of the detecting member 301 is adjusted, the contact pressure with the object to be measured 345 can be adjusted, whereby even if it is a minute pressure, its measurement is made possible.

Therefore, if a measuring machine 330 of the example of the third invention is used, even if the object to be measured 345 is easy to be deformed and easy to be damaged, such as a thick-film pattern formed on a laminated chip condenser, an IC package and the like of which measurement has been impossible, measurement can be conducted.

Incidentally, as a noncontacting type measuring machine which can be used for the measuring machine of the third invention, it is not restricted to the measuring machine 331 shown in FIG. 10, any measuring machine such as a measuring machine 1 of said first and second inventions and the like will do, so far as it can inject gas pressure and measure in a noncontacting state, and by adding a detecting member 301 to these noncontacting tye measuring machines, the measuring machine 330 of the third invention can be formed.

Experiments

By using the measuring machine 330 of the present invention shown in FIG. 10, the measurement accuracy when measurement of the block gage having a thickness of 1 mm was repeated 20 times was confirmed.

The detecting member 301 of the measuring machine 330 of the third invention forms the movable portion with a probe 306 made of diamond in a semisphere shape having a diameter of 1 mm, a pressure-receiving plate 306 made of alumina ceramics in a disk shape having a thickness of 0.06 mm, and a film 308 made of stainless having a thickness of 0.02 mm, and the weight of the movable portion is made to be 0.03 g. And this detecting member 301 is provided with a gas injection hole 305 comprising three holes having a diameter of about 1.0 mm, the diameter of the piston 303 being 10 mm, and the piston 303 and the cylinder 302 being formed by alumina ceramics, respectively.

Moreover, the diameter of the outer hole 335b of the nozzle 335 of the noncontacting type measuring machine 331 is to be 2.2 mm, and the amplified rate is set to be about 20 times.

And while a gas pressure of 2 g is supplied from the nozzle 335 of the noncontacting type measuring machine 331, a gas pressure of 0.2 kg is supplied to the gas supply port 304 of the detecting member 301, and measurement is carried out by setting the injection pressure from the gas injection hole 305 to be 0.08 g, then the contact pressure with the object to be measured will be 0.11 g, since the contact pressure applied to the block gage is the sum of the weight of the movable portion and the injection pressure.

When the thickness measurement of the block gage was conducted under these conditions, the average value of the measurement data was 1.00024 mm, and the difference (repeatability) of the data on the way to and from when being reciprocated was 0.09 μm at most, whereby it was found out that a measurement with high accuracy could be conducted.

Then, by using a measuring machine 330 of said third invention, a sectional shape of a resistance film having a height of about 5 μm and a width of about 80 μm which was composed of a molybdenum alloy formed on the ceramic substrate was measured.

Incidentally, various conditions were the same as the above experiment.

Figure 15:
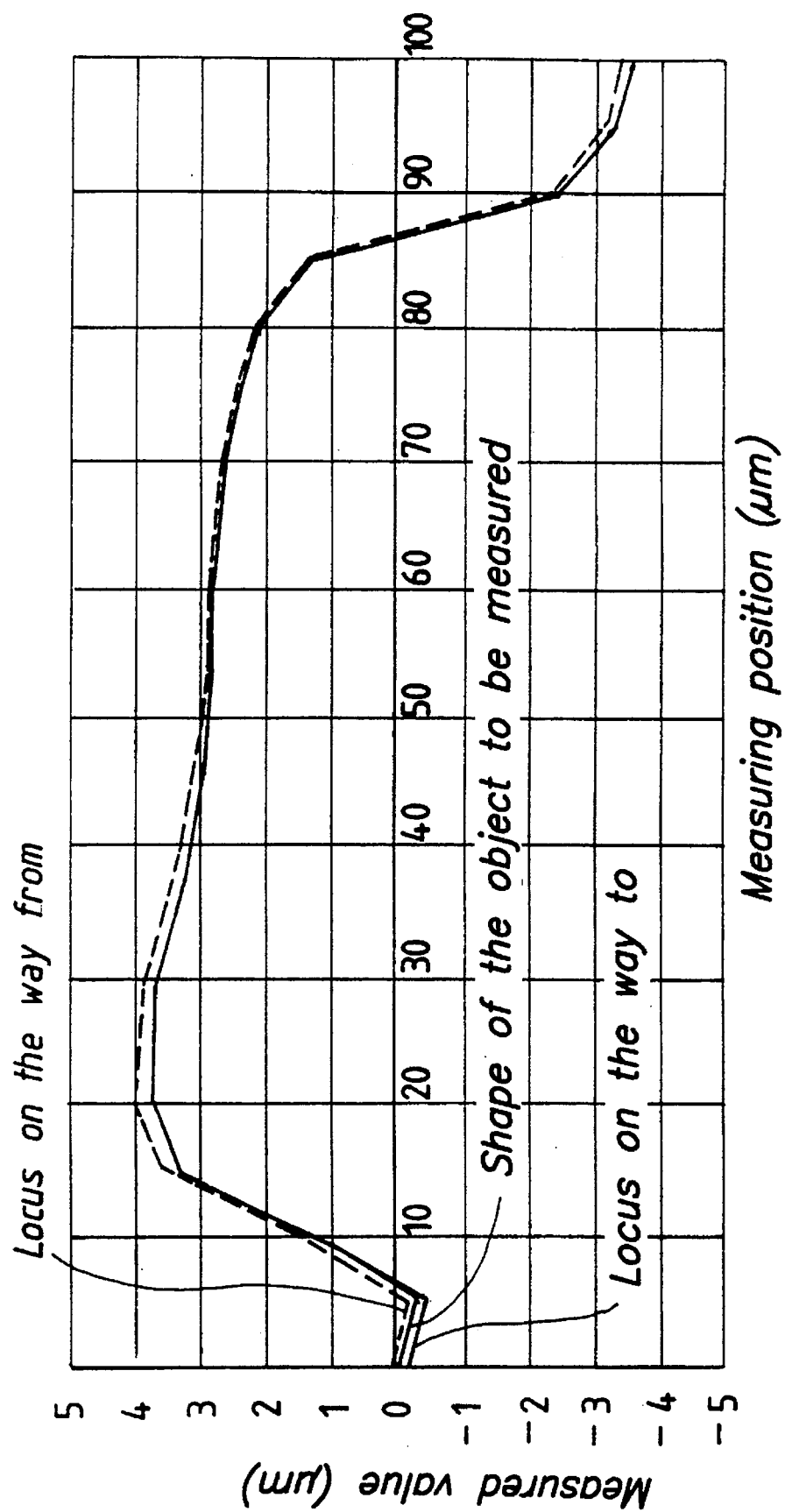
FIG. 15 is a graph which measures a thick-film pattern by the measuring machine according to the third invention.

The result is shown in FIG. 15. However, the resistance film in FIG. 15 is at the measuring position of from 5 to 85 μm.

As seen from FIG. 15, the plotted points practically trace the sectional shape of the resistance film, and the repeatability of the measurement is quite excellent.

Thus, according to the third invention, by making the structure such that a gas supply port and a gas injection hole are provided respectively on the side wall and at the tip of the cylinder into which a piston is inserted, and at the tip of said gas injection hole, a pressure-receiving plate having a probe is provided with a clearance to form a detecting member attached to the cylinder, said detecting member being attached to the nozzle of a noncontacting type measuring machine of a gas injection style, the measuring machine is made to be either a noncontacting type or a contacting type by attaching or detaching the detecting member, which is very practical.

Furthermore, said detecting member can measure with an optimum contact pressure depending on the object to be measured, only by adjusting the injection pressure from the gas injection hole. In addition, the piston which transmits the back pressure to the noncontacting type measuring machine is hydrostatically supported, and the weight of the movable portion is suppressed to the utmost, whereby a measurement with a very small contact pressure of 1 g or less is made possible. Thereby, even if the object to be measured is easy to be deformed and easy to be damaged, such as a thick-film pattern formed on a laminated chip condenser, an IC package and the like of which measurement has been impossible, measurement can be conducted.

Figure 23:
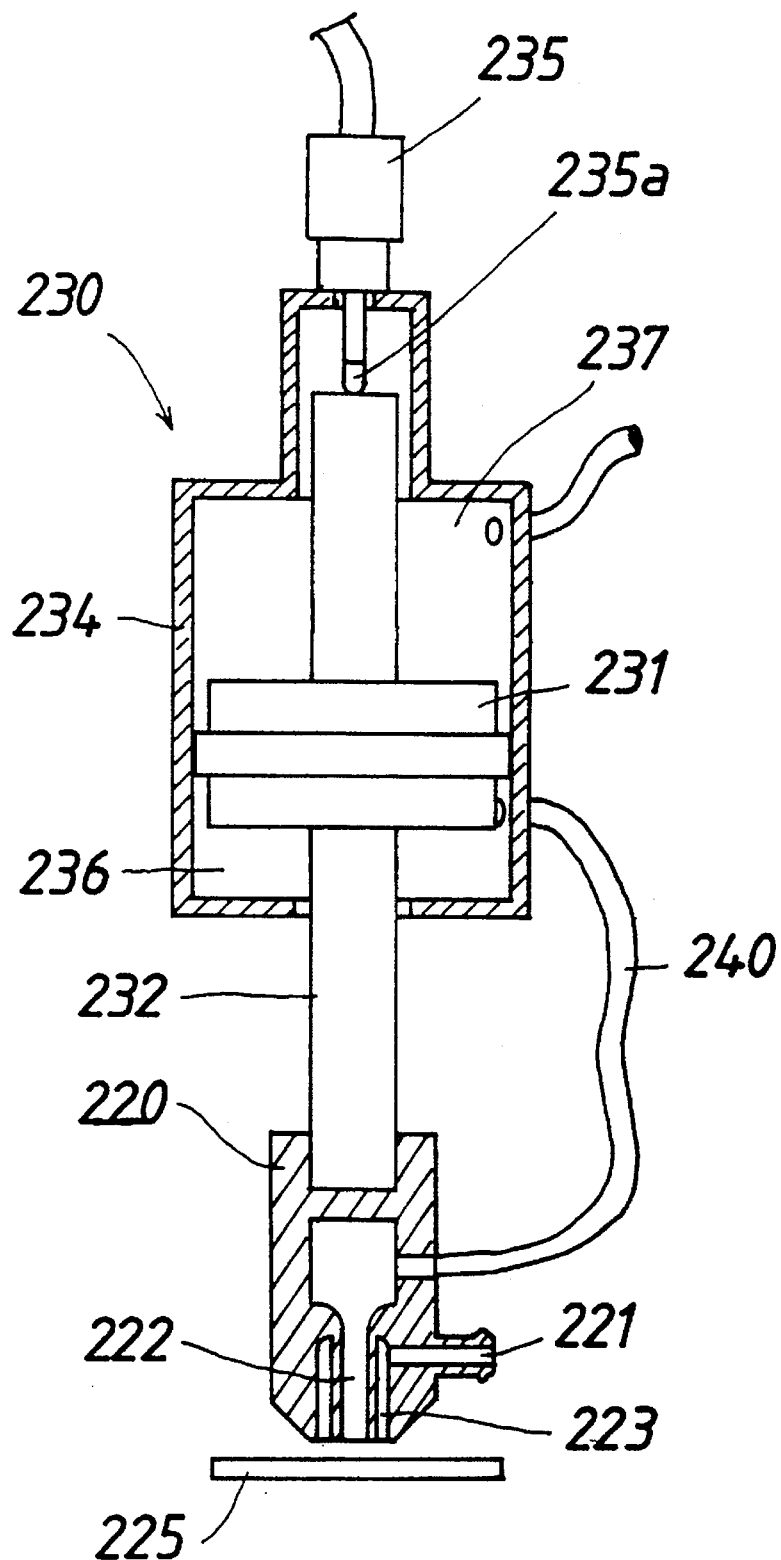
FIG. 23 is a longitudinally sectional view showing a general noncontacting type measuring machine.

Next, the example of the fourth invention will be described. However, the identical parts with FIG. 23 are shown in the same reference numeral.

Figure 16:
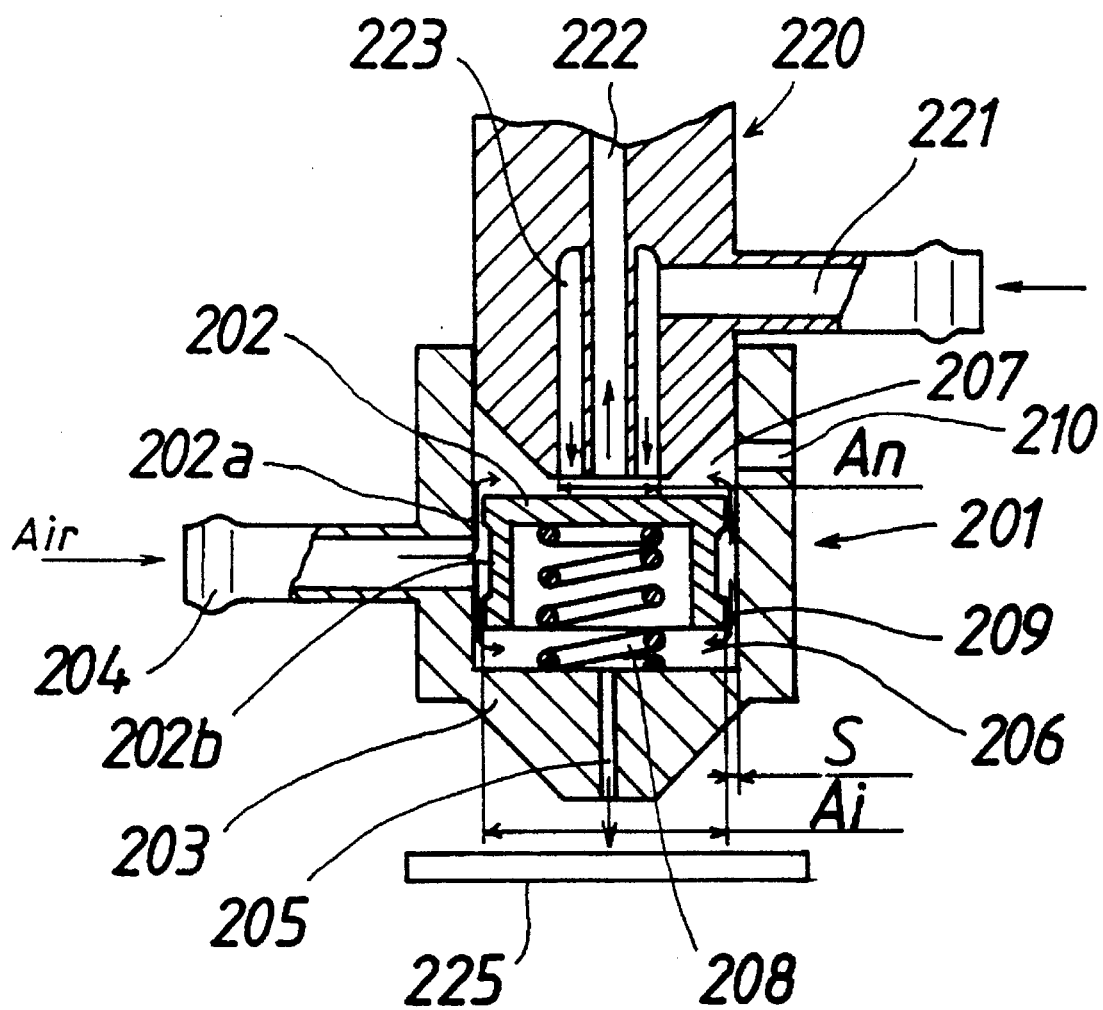
FIG. 16 is a longitudinally sectional view showing the state that a pressure amplifier of the fourth invention is attached to an injection nozzle of a noncontacting type measuring machine.

FIG. 16 is a longitudinally sectional view showing a state that a pressure amplifier 201 is attached to a nozzle 220 of the measuring machine (not shown), and this pressure amplifier 201 is formed by inserting a piston 202 into the inner hole of a cylinder 203, the lower chamber separated by said piston 202 being an input chamber 206, and the upper chamber being an output chamber 207. And at the tip portion of the cylinder 203, an injection hole 205 linked to the input chamber 206 is provided in the axial direction, and on the bottom face of the inner hole of the cylinder 203, a spring 208 for supporting the piston 202 is disposed. And the output chamber 207 is connected to the nozzle 220 by a means such as bolting and the like.

Incidentally, for the high sensitivity, the spring 208 had better not be used, but if the spring 208 is not used, there may be caused vibrations.

Furthermore, on the side wall of the cylinder 203, there are formed a supply port 204 for supplying the air pressure to the outer wall face of the piston 202 and an exhaust port 210 for releasing the pressure in the output chamber 207.

Figure 17:
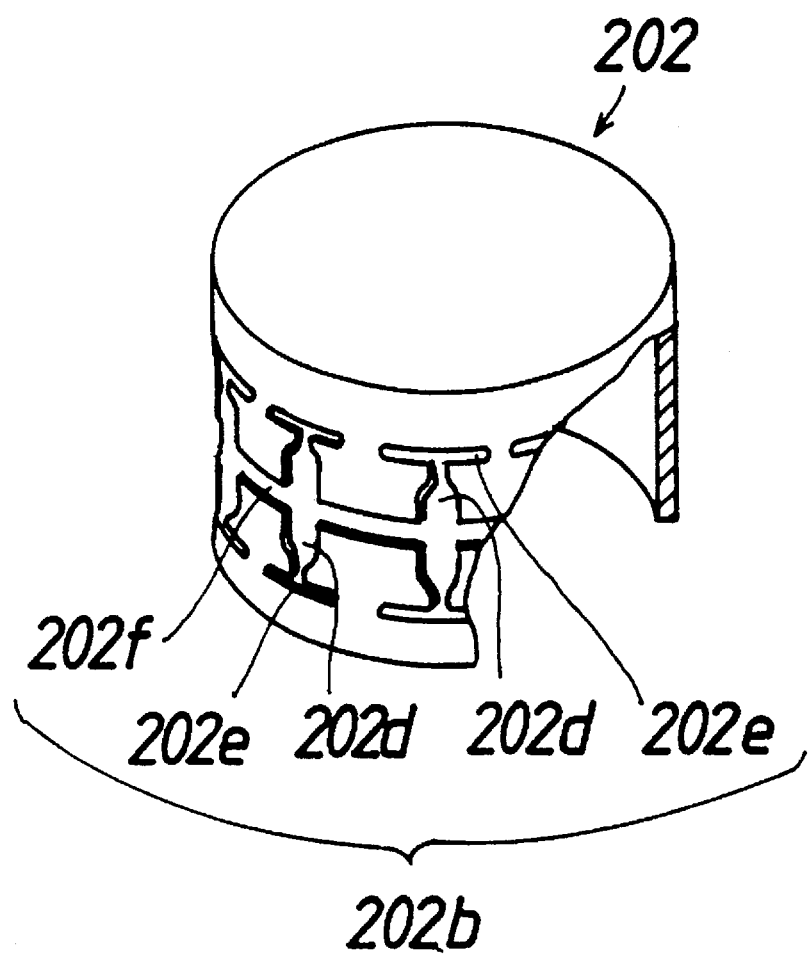
FIG. 17 is a perspective view showing a piston, a part of which being broken, which constitutes the pressure amplifier of the fourth invention.

On the outer wall face of the piston 202, a draw groove 202b is formed composed of a plenty of longitudinal grooves 202d arranged along the moving direction of the piston 202, blast grooves 202e linked to these longitudinal grooves 202d, and a horizontal groove 202f formed on the whole pheriphery of the outer wall face orthogonally crossing said longitudinal grooves 202d, as shown in FIG. 17, and a clearance 209 provided between the piston 202 having this draw groove 203b and the cylinder 203 is formed to have a width of from 3 to 10 μm, preferably from 3 to 4 μm.

Here, the reason why the width S of said clearance 209 is to be from 3 to 10 μm is that if the clearance 209 is smaller than 3 μm, a gas layer cannot be formed in the clearance 209 between the piston 202 and the cylinder 203 because of too small width S of the clearance 209, and the piston 202 cannot be hydrostatically supported, and on the contrary, if the width S of the clearance 209 is larger than 10 μm, a pressure injected from the gas supply hole 204 is weakened up to the draw groove 203b of the piston 202, and a gas layer cannot be formed over the whole outer periphery of the piston 202 and the piston 202 cannot be hydrostatically supported.

Incidentally, the draw groove 202b on the outer wall face 202a of the piston 202 may have any shape which can form an uniform air layer in the clearance 209 between the cylinder 203 and the piston 202. And, the shape of the piston 202 may be a columnar body or a square pillar body depending on the shape of the cylinder 203 which constitutes the outer frame of the pressure amplifier 201.

In addition, as a material of the piston 202 and the cylinder 203 which compose this pressure amplifier 201, it is preferred that it be formed by ceramics, and particularly preferable that it be formed by, for example, alumina ceramics, zirconia ceramics, silicon carbide ceramics, or silicon nitride ceramics, etc. These ceramics have a small specific gravity and are excellent in chemical resistance and heat resistance, whereby even in a measurement at a high temperature, under a moist environment, or in the case of a metal, measurement by using a gas which is corrosive, any rust or corrosion is not caused. Moreover, the pressure amplifier 201 is made to have an excellent sensitivity even against a minute pressure. In addition, as a material to constitute the pressure amplifier 201, it is not restricted to the above-mentioned materials, but it may be composed of other ceramics.

Next, the working principle of this pressure amplifier 201 will be described. The measuring machine is the one shown in FIG. 23.

First, when the air is supplied from the supply port 204, its pressure is supplied to the whole area of the draw groove 202b of the piston 202, and the air layer is formed in the clearance 209 between the piston 202 and the cylinder 203 to hydrostatically support the piston 202. At this time, the leak pressure flown into the output chamber 207 from said clearance 209 is released into the air from the exhaust port 210 provided on the side wall of the cylinder 203, and the leak pressure flown into the input chamber 206 is injected from the injection hole 205 toward the object to be measured 225.

Then, when the measuring machine 230 is actuated, the air supplied from the gas supply port 221 is injected from the outer hole 223 of the nozzle 220 to the piston 202 of the pressure amplifier 201, and in this state, when the object to be measured 225 is brought close to the injection hole 205 of the pressure amplifier 201, the back pressure corresponding to the distance between the injection hole 205 and the object to be measured 225 is taken into the input chamber 206 to increase the pressure in the input chamber 206. As a result, the piston 202 moves upward. And when the force which pushes the piston 202 downward by the injection pressure from the nozzle 220 and the force which pushes the piston 202 upward by the back pressure from the object to be measured 225 become equal, the piston 202 stops.

At this time, if the injection pressure from the nozzle 220 is assumed to be Pn, the back pressure taken into the input chamber 206 is assumed to be Pi, the effective area of the piston 202 is assumed to be Ai, and the effective area of the nozzle 220 is assumed to be An, the following equation is realized:

$$Pn=(Ai/An) \times Pi.$$

Therefore, for example, the back pressure from the object to be measured 225 is increased and the pressure δPi which is the increased amount of the back pressure of the input chamber 206 is taken in, the increased amount of the pressure Pn detected by the inner hole 222 of the nozzle 220 will be Ai/An·δPi and can be taken out amplified by Ai/An times. Namely, the pressure signal can be amplified by the ratio of the effective area Ai of the piston 202 to the effective area An of the nozzle 220.

Therefore, if the measuring machine of the fourth invention having this pressure amplifier 201 is used, even when an object to be measured 225 which is easy to be deformed, such as a thin-plate glass of a liquid crystal display and the like or a plastic is measured, since the injection pressure from the injection hole 205 is low, the object to be measured 225 are not deformed, and the sensitivity is also increased by adjusting the pressure supplied from the supply hole 204, whereby even a minute pressure change can be amplified and output. Moreover, since the pressure amplifier 201 per se has a simple structure, it can be produced easily, and if the whole structure thereof is composed of ceramics, it will become such a pressure amplifier 201 that it is not required to worry about the storing place and the environment to be used.

In addition, the use of the pressure amplifier 201 of the present invention is not limited only to a measuring machine, but may be used as an amplifier of a machinery which is driven by amplifying the gas pressure.

Experiment

Figure 24:
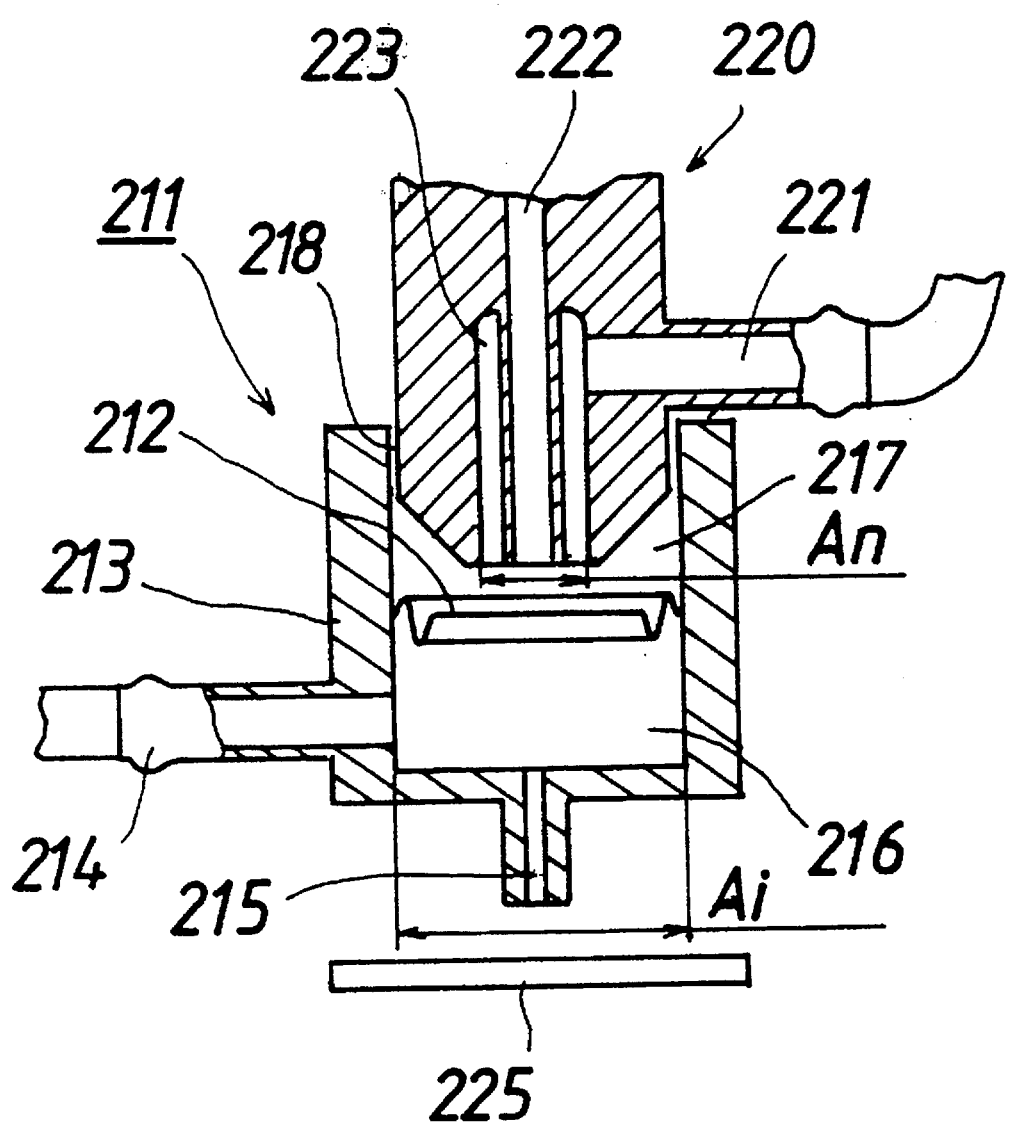
FIG. 24 is a longitudinally sectional view showing a state that a conventional pressure amplifier is attached to an injection nozzle of a noncontacting type measuring machine.

An experiment was conducted with regard to the input/ output property and the difference in the output pressure by using the pressure amplifier 201 of the fourth invention and a conventional bellowphragm type pressure amplifier 211 shown in FIG. 24 as a comparative example.

In the pressure amplifier 201 of the fourth invention, the effective area Ai of the piston 202 was set to be 25 $\pi mm^2$, and the width S of the clearance 209 with the cylinder 203 was set to be 3 μum, and the injection hole 205 having a diameter of 1 mm was used. And in the pressure amplifier 211 of the comparative example, the effective area Ai of the diaphragm 212 and the diameter of the injection hole 215 were the same as those of the fourth invention, and the diaphragm 212 made of stainless was used to conduct the measurement under the following conditions.

The effective area of the nozzle 220 of the measuring machine 230 used in this experiment is 1.25 $\pi mm^2$, and it is so set that a force of 2.0 $g/mm^2$ is always applied to the piston or the diaphragm from said nozzle, and the pressure injected from the injection holes 205 and 215 to the supply ports 204 and 214 of each pressure amplifier 201, 211 is to be 0.1 $kg/mm^2$ to conduct the measurement.

Figure 18:
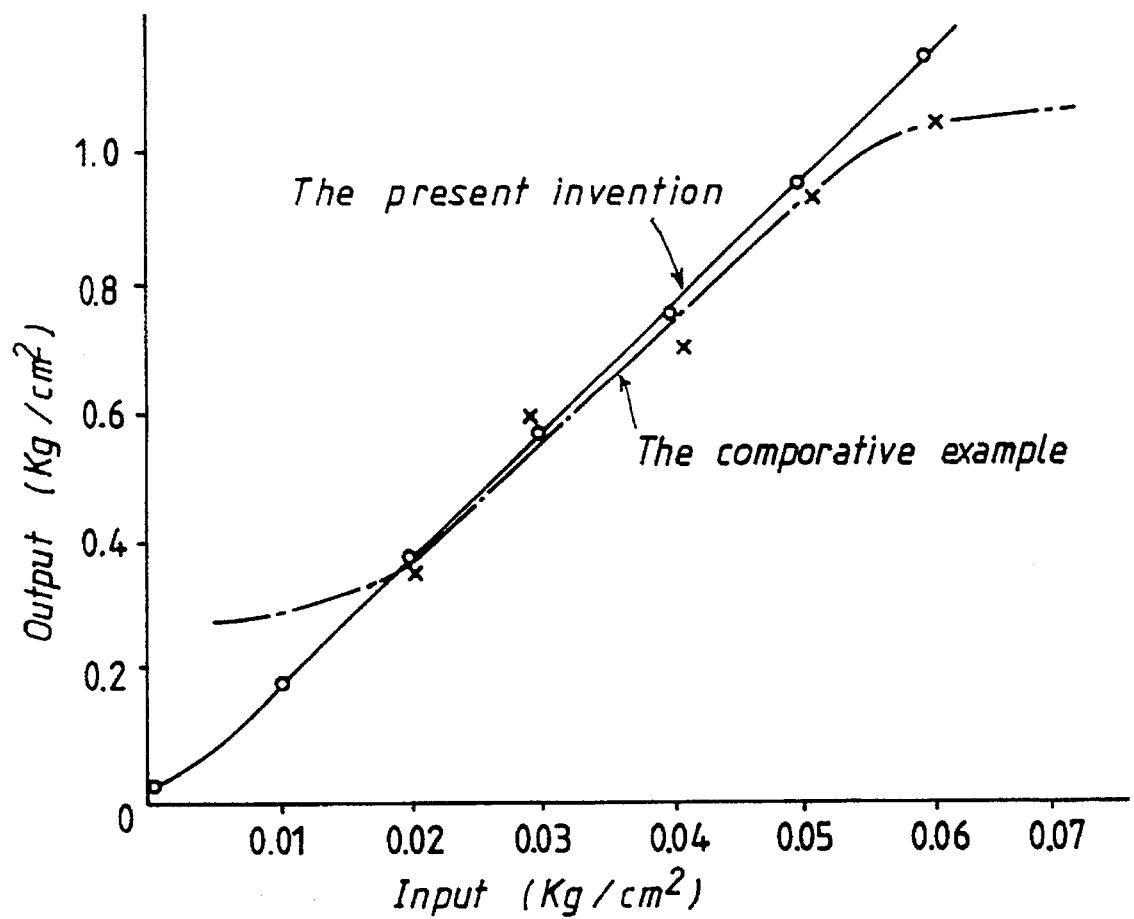
FIG. 18 is a graph showing the input/output characteristics of the pressure amplifier of an Example and a Comparative Example of the fourth invention.
Figure 19:
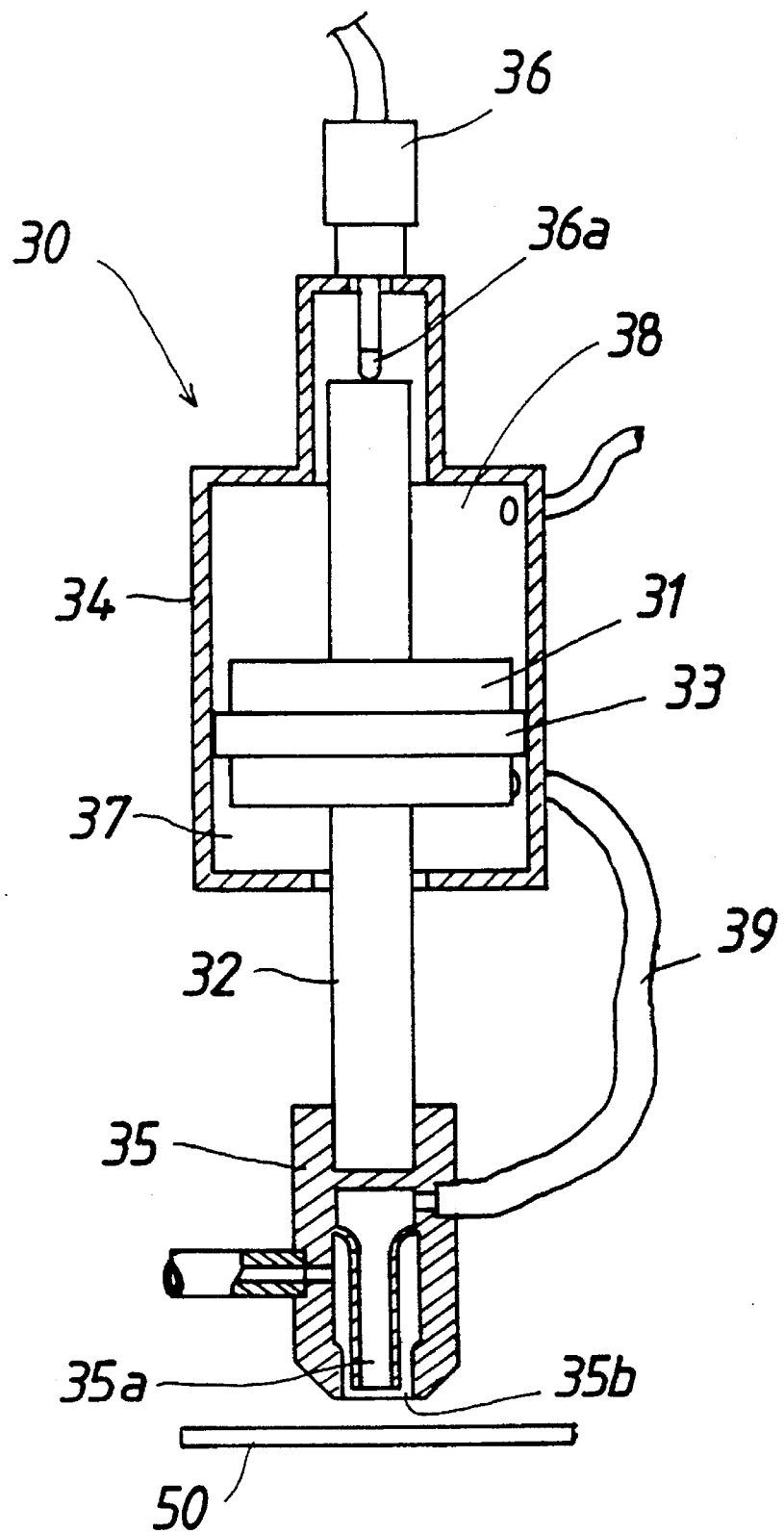
FIG. 19 is a longitudinally sectional view showing a conventional noncontacting type measuring machine.
Figure 20:
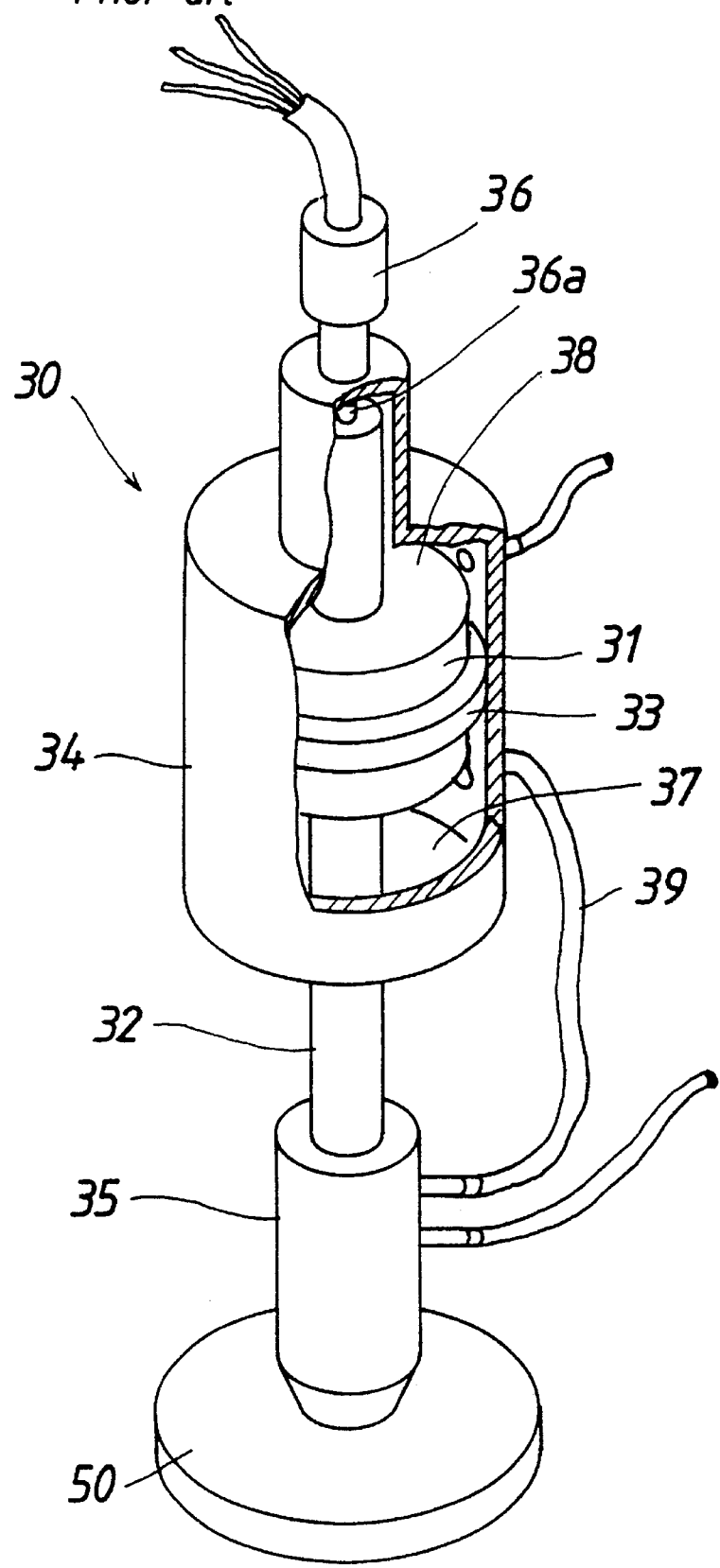
FIG. 20 is a perspective view, a part of FIG. 19 being broken.
Figure 21:
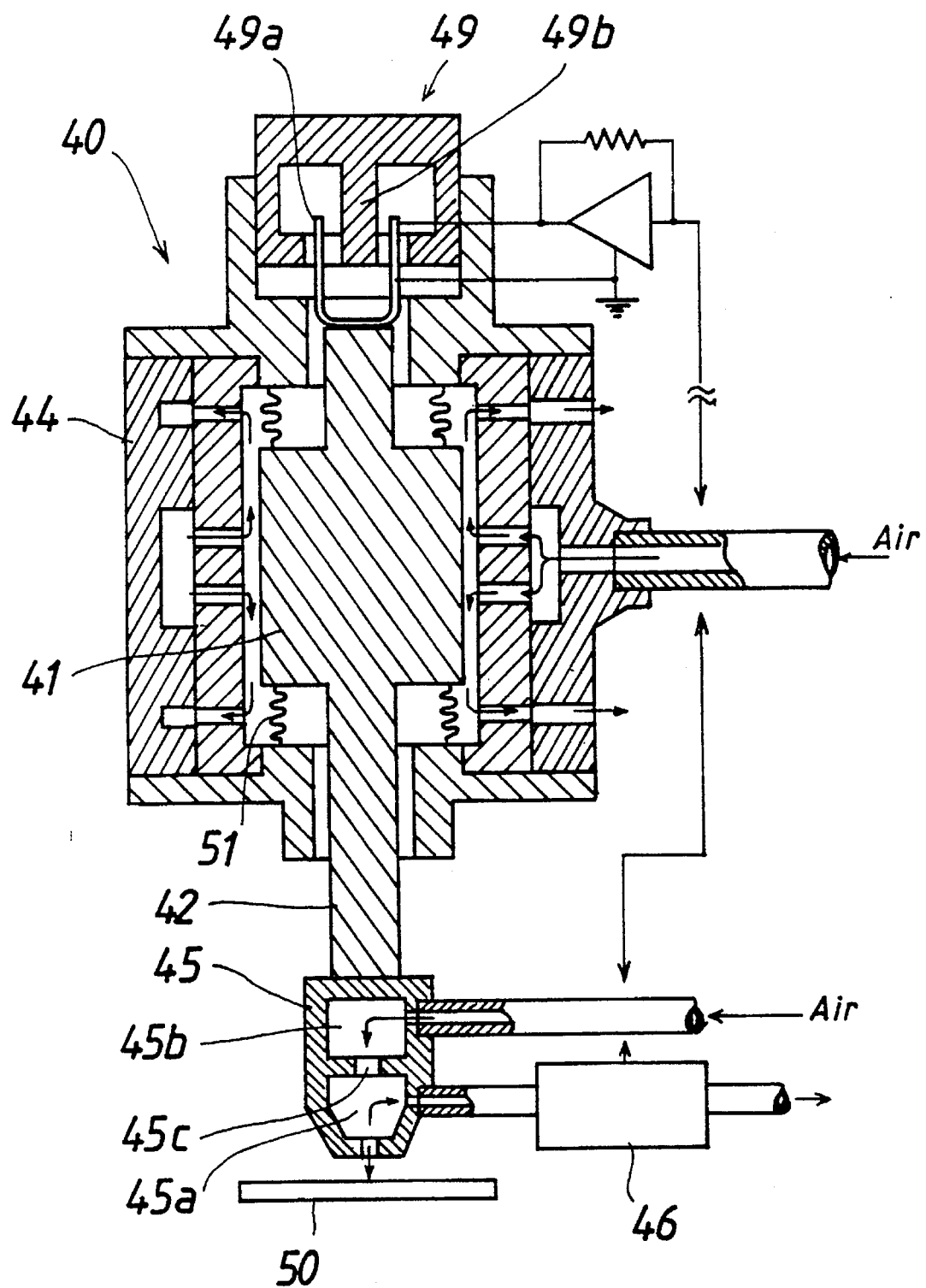
FIG. 21 is a longitudinally sectional view showing a conventional noncontacting type measuring machine.
Figure 22:
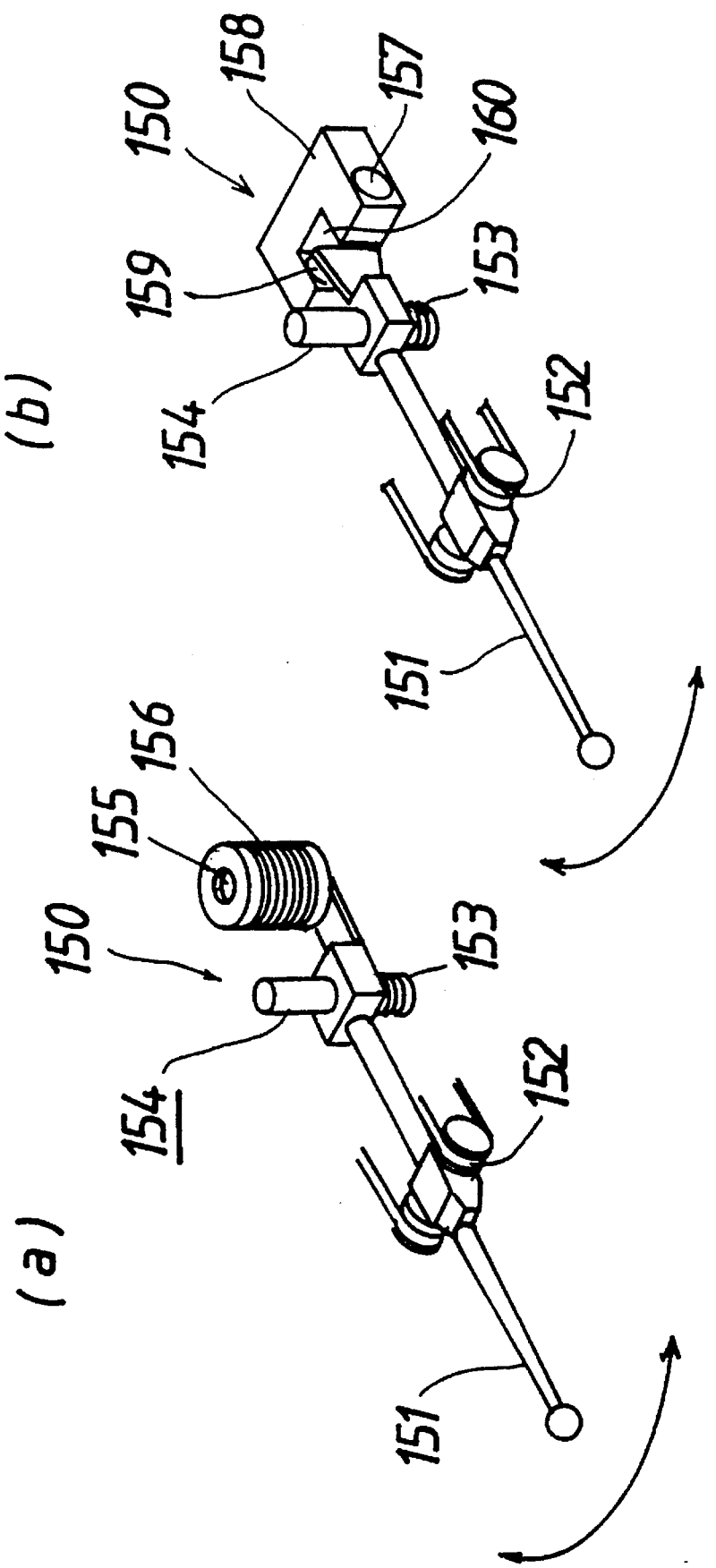
FIG. 22 is a perspective view showing the main part of the conventional noncontacting type measuring machine, (a) shows the one whose detecting method is electromagnetic induction type, and (b) shows the one whose detecting method is photoelectric type.

As a result, the relation between the input pressure and the output pressure is as shown in FIG. 18. However, among the plotted points, ○ shows the ones of the pressure amplifier 201 of the fourth invention, and X shows the ones of the pressure amplifier 211 of the comparative example. And, the amplified rate at this time is about 20 times for both cases.

As seen from FIG. 18, there are differences in the plotted points in the pressure amplifier 211 of the comparative example, and they are not on a straight line. Furthermore, it is seen that the linearity can be obtained only in a narrow range.

On the contrary, the plotted points in the pressure amplifier 201 of the fourth invention are on a straight line. Furthermore, it is seen that the amplification is possible in a wide range.

Thus, according to the fourth invention, since the pressure amplifier has a piston structure, partial deformation as in the conventional bellowphragm is not caused, and the hysteresis is not caused, either. Furthermore, since said piston is hydrostatically supported, the sliding resistance is as good as nonexistent, and the piston can move freely and smoothly. Therefore, there is no difference in the output signal, and excellent linearity can be obtained in a wide range between the input and output pressures. Moreover, it has excellent responding property, whereby even if the input pressure is minute, it can be measured. Thus, the pressure amplifier according to the fourth invention has extremely high reliability.

What is claimed is:

1. A measuring machine for measuring objects, comprising:

a cylinder, a piston movably disposed in the cylinder, the piston defining at least a first side and a second side, a rod projecting from the piston and having a tip, an injection nozzle attached to the tip of the rod, supporting means for hydrostatically supporting the piston in the cylinder, detecting means for detecting displacement of the piston in the cylinder, at least a first and a second pressurizing chamber, the first pressurizing chamber being formed on the first side of the piston and the second pressurizing chamber being formed on the second side of the piston, the first pressurizing chamber being linked to the injection nozzle, and the second pressurizing chamber having a pressure control valve.

2. The measuring machine of claim 1, comprising a tubular body linking the injection nozzle and at least one of the pressurizing chambers.

3. The measuring machine of claim 1, wherein the rod defines a fluid passage linking the injection nozzle and at least one of the pressurizing chambers.

4. The measuring machine of claim 1, wherein the injection nozzle defines a first hole and a second hole, the first hole being linked to at least one of the pressurizing chambers and the second hole being supplied with a gas to be injected from an injection port.

* * * * *